US011061488B2

(12) United States Patent
Reich et al.

(10) Patent No.: US 11,061,488 B2
(45) Date of Patent: Jul. 13, 2021

(54) AUTOMATING AND REDUCING USER INPUT REQUIRED FOR USER SESSION ON WRITING AND/OR DRAWING SYSTEM

(71) Applicant: Topoleg, Inc., Irvine, CA (US)

(72) Inventors: Jason Michael Reich, Irvine, CA (US); Francesco Lavra, Cagliari (IT)

(73) Assignee: Topoleg, Inc., Irvine, CA (US)

( * ) Notice: Subject to any disclaimer, the term of this patent is extended or adjusted under 35 U.S.C. 154(b) by 0 days.

(21) Appl. No.: 16/870,129

(22) Filed: May 8, 2020

(65) Prior Publication Data
US 2020/0356190 A1 Nov. 12, 2020

Related U.S. Application Data

(60) Provisional application No. 62/846,550, filed on May 10, 2019.

(51) Int. Cl.
| | |
|---|---|
| *G06F 3/0354* | (2013.01) |
| *G06F 3/038* | (2013.01) |
| *G06F 17/18* | (2006.01) |
| *H04W 76/19* | (2018.01) |
| *H04W 4/80* | (2018.01) |
| *H04W 76/11* | (2018.01) |

(Continued)

(52) U.S. Cl.
CPC ............ *G06F 3/03545* (2013.01); *G06F 3/02* (2013.01); *G06F 3/0383* (2013.01); *G06F 3/0416* (2013.01); *G06F 17/18* (2013.01); *G09G 5/14* (2013.01); *H04W 4/80* (2018.02); *H04W 76/11* (2018.02); *H04W 76/19* (2018.02); *G06F 13/4282* (2013.01); *G06F 2203/0384* (2013.01); *G06F 2213/0042* (2013.01); *G09G 2354/00* (2013.01)

(58) Field of Classification Search
CPC ................. G06F 13/4282; G06F 17/18; G06F 2203/0384; G06F 2213/0042; G06F 3/02; G06F 3/03545; G06F 3/0383; G06F 3/0416; G09G 2320/08; G09G 2354/00; G09G 2370/042; G09G 5/14; H04W 4/80; H04W 76/11; H04W 76/19
See application file for complete search history.

(56) References Cited

U.S. PATENT DOCUMENTS

| | | | |
|---|---|---|---|
| 5,880,743 | A | 3/1999 | Moran et al. |
| 5,926,168 | A | 7/1999 | Fan |

(Continued)

OTHER PUBLICATIONS

International Search Report and Written Opinion, issued in PCT/US2020/032077 dated Sep. 11, 2020, 14 pages.

*Primary Examiner* — Chun-Nan Lin
(74) *Attorney, Agent, or Firm* — Rothwell, Figg, Ernst & Manbeck, P.C.

(57) ABSTRACT

A writing and/or drawing system including one or more user controllers, one or more sensors, one or more display devices, a remote system, and/or one or more setup computers each executing a setup application. The writing and/or drawing system may recognize when users come in range or go out of range and may receive one or more inputs from in range users. The writing and/or drawing system may automatically provide a user with access to information in the user's account when the user comes in range and may automatically save writing and/or drawing content to the user's account when the user goes out of range.

31 Claims, 14 Drawing Sheets

(51) Int. Cl.
  *G06F 3/02* (2006.01)
  *G06F 3/041* (2006.01)
  *G09G 5/14* (2006.01)
  *G06F 13/42* (2006.01)

(56) References Cited

U.S. PATENT DOCUMENTS

| | | |
|---|---|---|
| 6,111,565 A | 8/2000 | Chery et al. |
| 6,394,610 B2 | 5/2002 | Rodriguez, Jr. |
| 6,437,314 B1 | 8/2002 | Usuda et al. |
| 6,700,129 B1 | 3/2004 | Usuda et al. |
| 7,219,233 B1 | 5/2007 | Hendriks et al. |
| 9,086,798 B2 | 7/2015 | Barrus et al. |
| 9,619,104 B2 | 4/2017 | Xin et al. |
| 10,275,047 B2 | 4/2019 | Li et al. |
| 10,339,342 B2 | 7/2019 | Ramirez Flores et al. |
| 2006/0125805 A1 | 6/2006 | Marggraff |
| 2007/0030257 A1 | 2/2007 | Bhogal et al. |
| 2007/0216660 A1 | 9/2007 | Sposato et al. |
| 2009/0251619 A1 | 10/2009 | Seidel et al. |
| 2011/0083018 A1* | 4/2011 | Kesanupalli ........... G06Q 20/40 713/186 |
| 2011/0246875 A1 | 10/2011 | Parker et al. |
| 2015/0058718 A1* | 2/2015 | Kim .................... G06F 3/03545 715/268 |
| 2015/0099469 A1* | 4/2015 | Goldstein ............... H04W 4/80 455/41.2 |
| 2015/0169069 A1 | 6/2015 | Lo et al. |
| 2016/0179335 A1 | 6/2016 | Thompson et al. |
| 2016/0381014 A1* | 12/2016 | Kim ..................... H04W 12/06 726/7 |
| 2017/0011227 A1 | 1/2017 | Tse et al. |
| 2017/0279653 A1 | 9/2017 | Gilson et al. |
| 2017/0315793 A1 | 11/2017 | Kanematsu |
| 2017/0372600 A1* | 12/2017 | Palin ................. H04M 1/72412 |
| 2018/0095709 A1 | 4/2018 | Nimri et al. |
| 2018/0167377 A1 | 6/2018 | Kato et al. |
| 2018/0322376 A1* | 11/2018 | Henry ................ G06K 19/0723 |
| 2018/0352377 A1* | 12/2018 | Schwarzer ........... H04B 5/0075 |
| 2020/0356190 A1 | 11/2020 | Reich et al. |
| 2020/0357363 A1 | 11/2020 | Reich et al. |

\* cited by examiner

AUTOMATING AND REDUCING USER INPUT REQUIRED FOR USER SESSION ON WRITING AND/OR DRAWING SYSTEM

CROSS-REFERENCE TO RELATED APPLICATION

The present application claims the benefit of priority to U.S. Provisional Application Ser. No. 62/846,550, filed on May 10, 2019, which is incorporated herein by reference in its entirety.

BACKGROUND

Field of Invention

Aspects of the present invention relate to writing and/or drawing systems and methods. Some aspects of the present invention may relate to writing and/or drawing systems and methods managed by a remote system.

Discussion of the Background

Conventional writing and/or drawing systems provide insufficient ease of use for and/or inadequate content management for multiple users with distinct user accounts.

SUMMARY

Aspects of the invention may address one or more shortcomings of conventional writing and/or drawing systems by automating and/or reducing the user input required for users to start a user session on a writing and/or drawing system, access previous work, save work, and/or end the user session.

One aspect of the present invention relates to a sensor including a communication interface and a controller. The controller may be configured to use the communication interface to receive a user controller (UC) identification conveyed by a UC. The UC identification may identify the UC. The controller may be configured to determine whether an in range event has occurred with respect to the UC. The controller may be configured to, if the in range event was determined to have occurred with respect to the UC, use the communication interface to convey the UC identification, a sensor identification, and an indication that an in range event occurred. The sensor identification may identify the sensor.

In some aspects, the communication interface may include a first wireless communication interface configured to communicate according to a first wireless communication protocol and a second wireless communication interface configured to communicate according to a second wireless communication protocol that is different than the first wireless communication protocol. In some aspects, the controller may be configured to use the first wireless communication interface to receive the UC identification conveyed by the UC and to use the second wireless communication interface to convey the UC identification, the sensor identification, and the indication that the in range event occurred.

In some aspects, determining that the in range event has occurred with respect to the UC may include determining that the UC identification that identifies the UC is not in a list of UC identifications for current in range UCs and determining that an in range condition is met for the UC. In some aspects, the controller may be configured to determine that the in range condition is met for the UC if the controller receives one or more packets that include the UC identification that identifies the UC. In some aspects, the controller may be configured to determine that the in range condition is met for the UC if the controller receives one or more packets that include the UC identification that identifies the UC and have a signal strength that is above an in range signal strength threshold.

In some aspects, the controller may be further configured to use the communication interface to receive a user input indication conveyed by the UC and use the communication interface to convey the UC identification, the sensor identification, and the user input indication. In some aspects, the user input indication may include an identification of a user input of the UC, and the user input indication indicates that the user input of the UC was activated. In some aspects, the user input indication may include an identification of a button of the UC, and the user input indication may indicate that the button of the UC was pressed. In some aspects, the controller may use the communication interface to convey the UC identification, the sensor identification, and the indication that the in range event occurred in a first packet and may use the communication interface to convey the UC identification, the sensor identification, and the user input indication in a second packet.

In some aspects, the controller may be further configured to, after determining that the in range event occurred with respect to the UC, determine whether an out of range event has occurred with respect to the UC. The controller may be further configured to, if the out of range event was determined to have occurred with respect to the UC, convey the UC identification, the sensor identification, and an indication that an out of range event occurred. In some aspects, determining that the out of range event has occurred with respect to the UC includes determining that an out of range condition is met for the UC. In some aspects, the controller may be configured to determine that the out of range condition is met for the UC if the controller does not receive any packets that include the UC identification that identifies the UC for a threshold amount of time, for each of N consecutive transmission periods, or for at least M of N consecutive transmission periods. In some aspects, the controller may be configured to determine that the out of range condition is met for the UC if the controller does not receive any packets that include the UC identification that identifies the UC and have a signal strength that is above an out of range signal strength threshold for a threshold amount of time, for each of N consecutive transmission periods, or for at least M of N consecutive transmission periods. In some aspects, determining that the out of range event has occurred with respect to the UC may further include removing the UC identification for the UC from the list of UC identifications for current in range UCs.

In some aspects, determining that the out of range event has occurred with respect to the UC may further include reducing or preventing false out of range events. In some aspects, determining that the out of range event has occurred with respect to the UC may further include determining that a distribution of changes in signal strength of packets received from the UC immediately prior to the UC going out of range of the sensor is within a threshold amount of one standard deviation from a mean distribution of changes in signal strength of packets received by the sensor from UCs immediately preceding the UCs going out of range of the sensor in true out of range events. In some aspects, determining that the out of range event has occurred with respect to the UC may further include, if a distribution of changes in signal strength of packets received from the UC immediately prior to the UC going out of range of the sensor is determined to be not within a threshold amount of one standard deviation from a mean distribution of changes in signal strength of packets received by the sensor from UCs immediately preceding the UCs going out of range of the sensor in true out of range events, determining that the UC does not reestablish communication with the sensor within the predetermined amount of time.

In some aspects, the controller may use the communication interface to convey the UC identification, the sensor identification, and the indication that the in range event occurred in a first packet and uses the communication interface to convey the UC identification, the sensor identification, and the indication that the out of range event occurred in a second packet.

Another aspect of the present invention relates to a method including receiving a user controller (UC) identification conveyed by a UC. The UC identification may identify the UC. The method may include determining whether an in range event has occurred with respect to the UC. The method may include, if the in range event was determined to have occurred with respect to the UC, conveying the UC identification, a sensor identification, and an indication that an in range event occurred. The sensor identification may identify a sensor.

In some aspects, the method may further include using a first wireless communication interface that communicates according to a first wireless communication protocol to receive the UC identification conveyed by the UC. In some aspects, the method may further include using a second wireless communication interface that communicates according to a second wireless communication protocol to convey the UC identification, the sensor identification, and the indication that the in range event occurred. The second wireless communication protocol may be different than the first wireless communication protocol.

In some aspects, determining whether the in range event has occurred with respect to the UC may include: determining that the UC identification that identifies the UC is not in a list of UC identifications for current in range UCs, and determining that an in range condition is met for the UC. In some aspects, determining that the in range condition is met for the UC may include determining that one or more packets that include the UC identification that identifies the UC were received. In some aspects, determining that the in range condition is met for the UC may include determining that one or more packets that include the UC identification that identifies the UC and have a signal strength that is above an in range signal strength threshold were received.

In some aspects, the method may further include: receiving a user input indication conveyed by the UC and conveying the UC identification, the sensor identification, and the user input indication. In some aspects, the user input indication may include an identification of a user input of the UC, and the user input indication may indicate that the user input of the UC was activated. In some aspects, the user input indication may include an identification of a button of the UC, and the user input indication may indicate that the button of the UC was pressed. In some aspects, the UC identification, the sensor identification, and the indication that the in range event occurred may be conveyed in a first packet, and the UC identification, the sensor identification, and the user input indication may be conveyed in a second packet.

In some aspects, the method may further include, after determining that the in range event occurred with respect to the UC, determining whether an out of range event has occurred with respect to the UC. The method may further include, if the out of range event was determined to have occurred with respect to the UC, conveying the UC identification, the sensor identification, and an indication that an out of range event occurred. In some aspects, determining that the out of range event occurred with respect to the UC may include determining that an out of range condition is met for the UC. In some aspects, determining that the out of range condition is met for the UC may include determining that no packets that include the UC identification that identifies the UC were received for a threshold amount of time, for each of N consecutive transmission periods, or for at least M of N consecutive transmission periods. In some aspects, determining that the out of range condition is met for the UC may include determining that no packets that include the UC identification that identifies the UC and have a signal strength that is above an out of range signal strength threshold were received for a threshold amount of time, for each of N consecutive transmission periods, or for at least M of N consecutive transmission periods. In some aspects, determining that the out of range event has occurred with respect to the UC may further include removing the UC identification for the UC from the list of UC identifications for current in range UCs.

In some aspects, determining that the out of range event has occurred with respect to the UC may further include reducing or preventing false out of range events. In some aspects, determining that the out of range event has occurred with respect to the UC may further include determining that a distribution of changes in signal strength of packets received from the UC immediately prior to the UC going out of range of the sensor is within a threshold amount of one standard deviation from a mean distribution of changes in signal strength of packets received by the sensor from UCs immediately preceding the UCs going out of range of the sensor in true out of range events. In some aspects, determining that the out of range event has occurred with respect to the UC may further include, if a distribution of changes in signal strength of packets received from the UC immediately prior to the UC going out of range of the sensor is determined to be not within a threshold amount of one standard deviation from a mean distribution of changes in signal strength of packets received by the sensor from UCs immediately preceding the UCs going out of range of the sensor in true out of range events, determining that the UC does not reestablish communication with the sensor within the predetermined amount of time.

In some aspects, the UC identification, the sensor identification, and the indication that the in range event occurred may be conveyed in a first packet, and the UC identification, the sensor identification, and the indication that the out of range event occurred may be conveyed in a second packet.

Still another aspect of the present invention relates to a system adapted to receive a user controller (UC) identification that identifies a UC, a sensor identification that identifies a sensor, and an event indication that indicates that an event occurred. The system may be adapted to use the sensor identification to identify an application running on a computer of a display device to which the sensor is connected. The system may be adapted to use the UC identification to determine a user identification with which the UC identification is associated. The system may be adapted to determine whether the event indication is for an in range event. The system may be adapted to, if the event indication is determined to be for an in range event, provide the application with access to information in a user account associated with the user identification.

In some aspects, the application may be a web application running in a web browser of the computer of the display device to which the sensor is connected. In some aspects, the information in the user account associated with the user identification may include one or more settings for the application running on the computer of the display device to which the sensor is connected, and the system may be further adapted to cause the application to apply the user settings.

In some aspects, the information in the user account associated with the user identification may include one or more files including previous writing and/or drawing content. In some aspects, the controller may be further configured to, if the event indication is determined to be for an in range event, cause the application to display a welcome message including a username associated with the determined user identification.

In some aspects, the system may be further adapted to receive the UC identification, the sensor identification, and a second event indication that indicates that a second event occurred. In some aspects, the system may be further adapted to: determine whether the second event indication is for an out of range event; if the second event indication is determined to be for an out of range event, cause the application to return current writing and/or drawing content; receive the current writing and/or drawing content; and save the current writing and/or drawing content in the user account associated with the user identification. In some aspects, the system may be further adapted to, if the second event indication is determined to be for an out of range event, cause the application to erase the current writing and/or drawing content. In some aspects, the system may be further adapted to, if the second event indication is determined to be for an out of range event, cause the application to lock itself.

In some aspects, the system may be further adapted to: determine whether the second event indication is for a user input event; if the second event indication is determined to be for a user input event, determine an action associated with the second event indication; and cause the application to perform the determined action. In some aspects, the second event indication that may be for a user input event comprises an identification of a user input of the UC, and the action associated with the second event indication may be determined based on the identification of the user input of the UC. In some aspects, the user input of the UC may be a button of the UC. In some aspects, the determined action may be one of toggle between pencil and eraser, undo last mark, copy board, and paste board.

Yet another aspect of the present invention relates to a method including receiving a user controller (UC) identification that identifies a UC, a sensor identification that identifies a sensor, and an event indication that indicates that an event occurred. The method may include using the sensor identification to identify an application running on a computer of a display device to which the sensor is connected. The method may include using the UC identification to determine a user identification with which the UC identification is associated. The method may include determining whether the event indication is for an in range event. The method may include, if the event indication is determined to be for an in range event, providing the application with access to information in a user account associated with the user identification.

In some aspects, the application may be a web application running in a web browser of the computer of the display device to which the sensor is connected. In some aspects, the information in the user account associated with the user identification may include one or more settings for the application running on the computer of the display device to which the sensor is connected, and the method may further include causing the application to apply the user settings.

In some aspects, the information in the user account associated with the user identification may include one or more files including previous writing and/or drawing content. In some aspects, the method may further include, if the event indication is determined to be for an in range event, causing the application to display a welcome message including a username associated with the determined user identification.

In some aspects, the method may further include using the communication interface to receive the UC identification, the sensor identification, and a second event indication that indicates that a second event occurred. In some aspects, the method may further include: determining whether the second event indication is for an out of range event; if the second event indication is determined to be for an out of range event, causing the application to return current writing and/or drawing content; receiving the current writing and/or drawing content; and saving the current writing and/or drawing content in the user account associated with the user identification. In some aspects, the method may further include, if the second event indication is determined to be for an out of range event, causing the application to erase the current writing and/or drawing content. In some aspects, the method may further include, if the second event indication is determined to be for an out of range event, causing the application to lock itself.

In some aspects, the method may further include the method may further include: determining whether the second event indication is for a user input event; if the second event indication is determined to be for a user input event, determining an action associated with the second event indication; and causing the application to perform the determined action. In some aspects, the second event indication that is for a user input event may include an identification of a user input of the UC, and the action associated with the second event indication may be determined based on the identification of the user input of the UC. In some aspects, the user input of the UC may be a button of the UC. In some aspects, the determined action may be one of toggle between pencil and eraser, undo last mark, copy board, and paste board.

Still another aspect of the present invention relates to a display device comprising a communication interface, a display, and a computer. The display may include N screen tiles, where N is greater than or equal to 2. The computer may be configured to perform an open operation comprising: using the communication interface to receive screen contents; partitioning the received screen content into N screen content partitions; and conveying one screen content partition to each of the screen tiles.

In some aspects, the computer may be configured to partition the received screen content into the N screen content partitions according to a geometry and arrangement of the N screen tiles. In some aspects, the computer may be configured to perform a save operation comprising: receiving from each of the N screen tiles the screen content of the screen tile; combining the screen contents of the N screen tiles; and using the communication interface to convey the combined screen contents. In some aspects, the computer may be configured to combine the screen contents of the N screen content partitions according to a geometry and arrangement of the N screen tiles.

Yet another aspect of the present invention relates to a method including using a communication interface of a display device to receive screen contents. The method may include using a computer of display device to partition the received screen content into N screen content partitions, where N is greater than or equal to 2. The method may include using the computer of the display device to convey the N screen content partitions to N screen tiles of a display of the display device. Each of the N screen tiles may receive a different one of the N screen content partitions.

Still another aspect of the present invention relates to a screen tile including a neighbor tile interface, a tile display, a display controller, one or more touch sensors, a touch controller, and a tile controller. The display controller may be configured to control the tile display to display pixel data. The touch controller may be configured to receive touch sensor data output from the one or more touch sensors. The tile controller may be configured to: receive a touch input event from the touch controller; determine whether the touch input event affects a neighboring screen tile; and, if the touch input event is determined to affect a neighboring screen tile, use the neighbor tile interface to convey the touch input event to the affected neighboring screen tile.

In some aspects, the screen tile may further include a master controller interface. The tile controller may be configured to: use the master controller interface to receive screen content; and use the display controller to cause the tile display to display the received screen content.

Yet another aspect of the present invention relates to a method including receiving a touch input event from a touch controller that receives touch sensor data output from one or more touch sensors of a screen tile. The method may include using a tile controller of the screen tile to determine whether the touch input event affects a neighboring screen tile. The method may include, if the touch input event is determined to affect a neighboring screen tile, using a neighbor tile interface to convey the touch input event to the affected neighboring screen tile.

Still another aspect of the present invention relates to a computer program comprising instructions for adapting an apparatus to perform any of the methods of the aspects set forth above. Yet another aspect of the present invention relates to a carrier containing the computer program, and the carrier is one of an electronic signal, optical signal, radio signal, or computer readable storage medium.

Still another aspect of the present invention relates to an apparatus comprising processing circuitry and a memory. The memory may contain instructions executable by said processing circuitry, whereby said apparatus is operative to perform the method of any one of the aspects set forth above.

Further variations encompassed within the systems and methods are described in the detailed description of the invention below.

BRIEF DESCRIPTION OF THE DRAWINGS

The accompanying drawings, which are incorporated herein and form part of the specification, illustrate various, non-limiting aspects of the present invention. In the drawings, like reference numbers indicate identical or functionally similar elements.

DETAILED DESCRIPTION

While the present invention may be embodied in many different forms, a number of illustrative aspects are described herein with the understanding that the present disclosure is to be considered as providing examples of the principles of the invention and such examples are not intended to limit the invention to preferred aspects described herein and/or illustrated herein.

1. Writing and/or Drawing System

Figure 1:
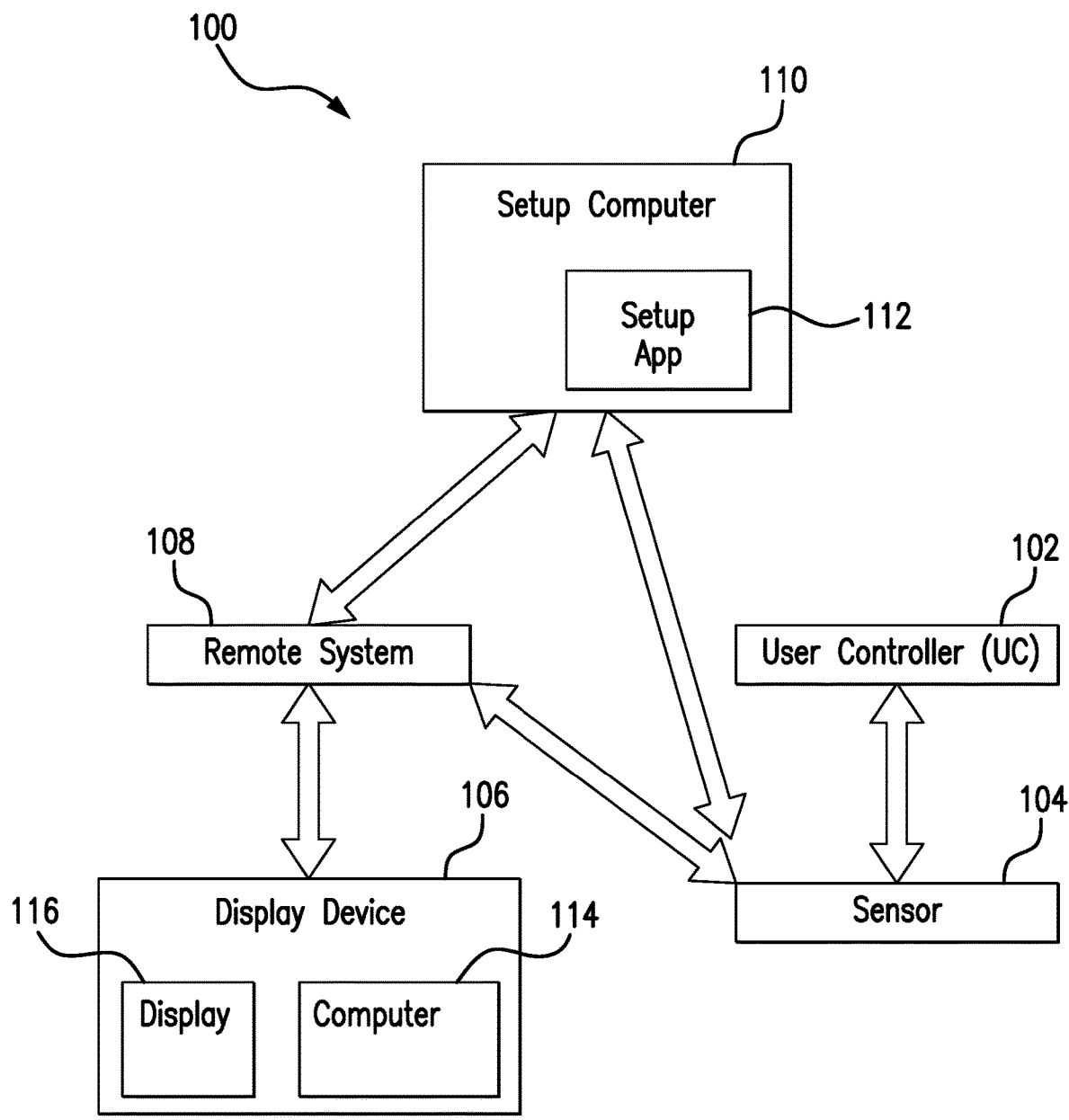
FIG. 1 is a block diagram illustrating a writing and/or drawing system embodying aspects of the present invention.

FIG. 1 illustrates a writing and/or drawing system 100 embodying aspects of the present invention. In some embodiments, the writing and/or drawing system 100 may include one or more user controllers (UCs) 102, one or more sensors 104, one or more display devices 106, a remote system 108, and/or one or more setup computers 110 each executing a setup application ("setup app") 112. In some embodiments, the one or more setup computers 110 may be any of a mobile phone (e.g., smartphone), tablet, laptop, or other personal computer. In some embodiments, a display device 106 may include one or more computers 114 and one or more displays 116. In some embodiments, the one or more displays 116 may include one or more touchscreens.

In some embodiments, the remote system 108 may include one or more of a database, a file storage service, a web server, a server dedicated to in-memory data structures for real-time data transmission, and instructions for caching content on proxy servers. In some embodiments, the web server may use software (e.g., web-based software). In some embodiments, the software may be writing and/or drawing software that allows users to use the display device 106 for handwriting and drawing arbitrary shapes. In some embodiments, the display device 106 may include one or more touchscreens, and the writing and/or drawing software may use touch technology of the one or more touchscreens to provide user input for the writing and/or drawing. In some web-based software embodiments, one or more web pages may serve the writing and/or drawing software.

1.1 User Controller (UC)

Figure 2A:
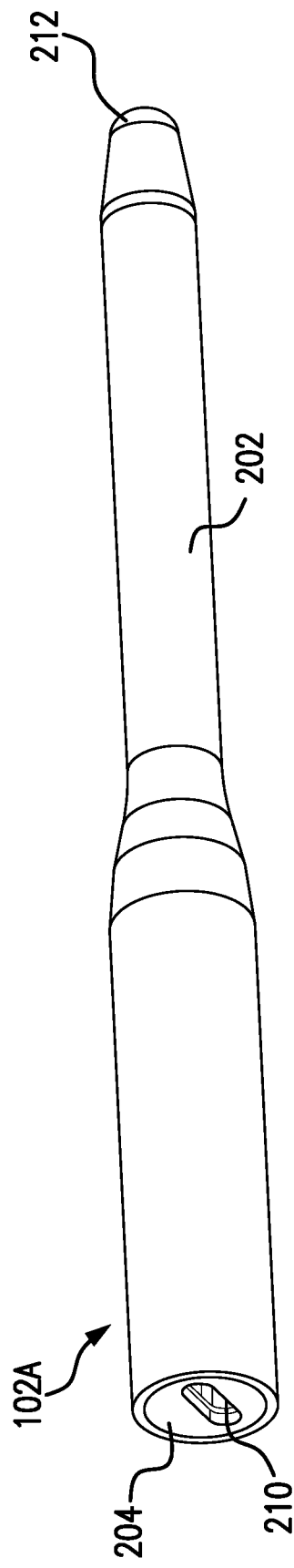
FIGS. 2A and 2B are perspective and exploded views of a pen version of a user controller of a writing and/or drawing system embodying aspects of the present invention.
Figure 2B:
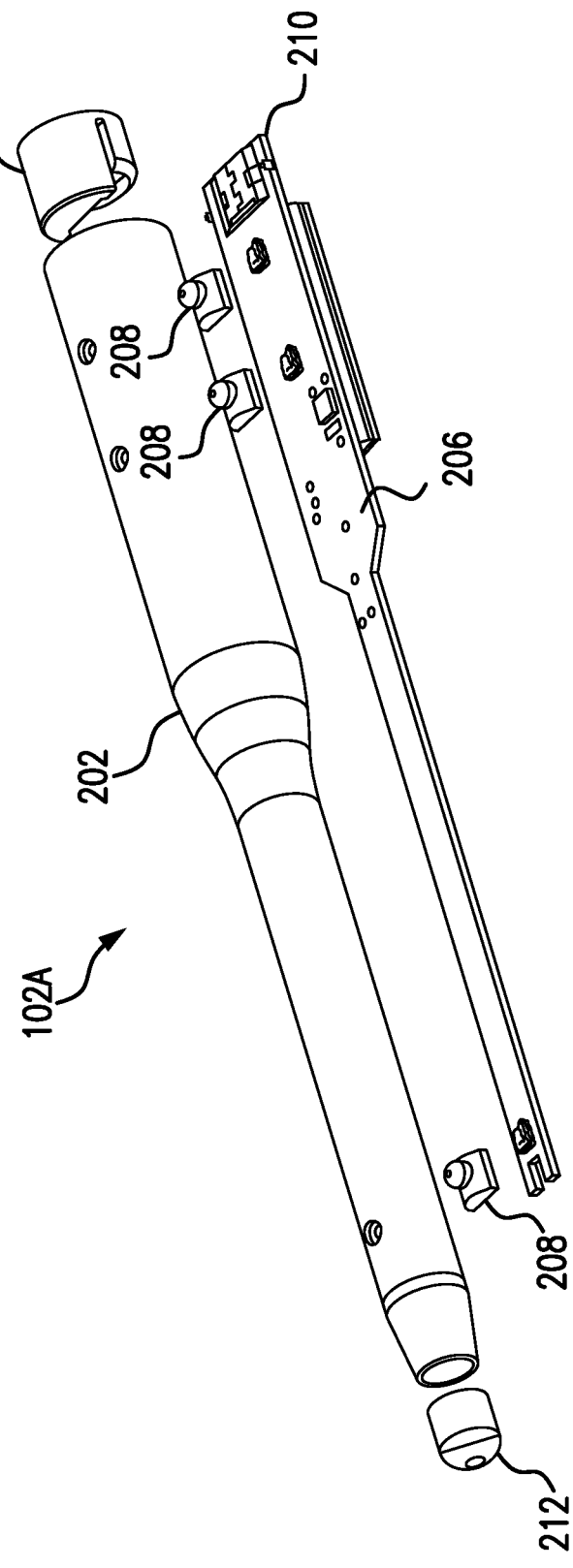
Figure 2C:
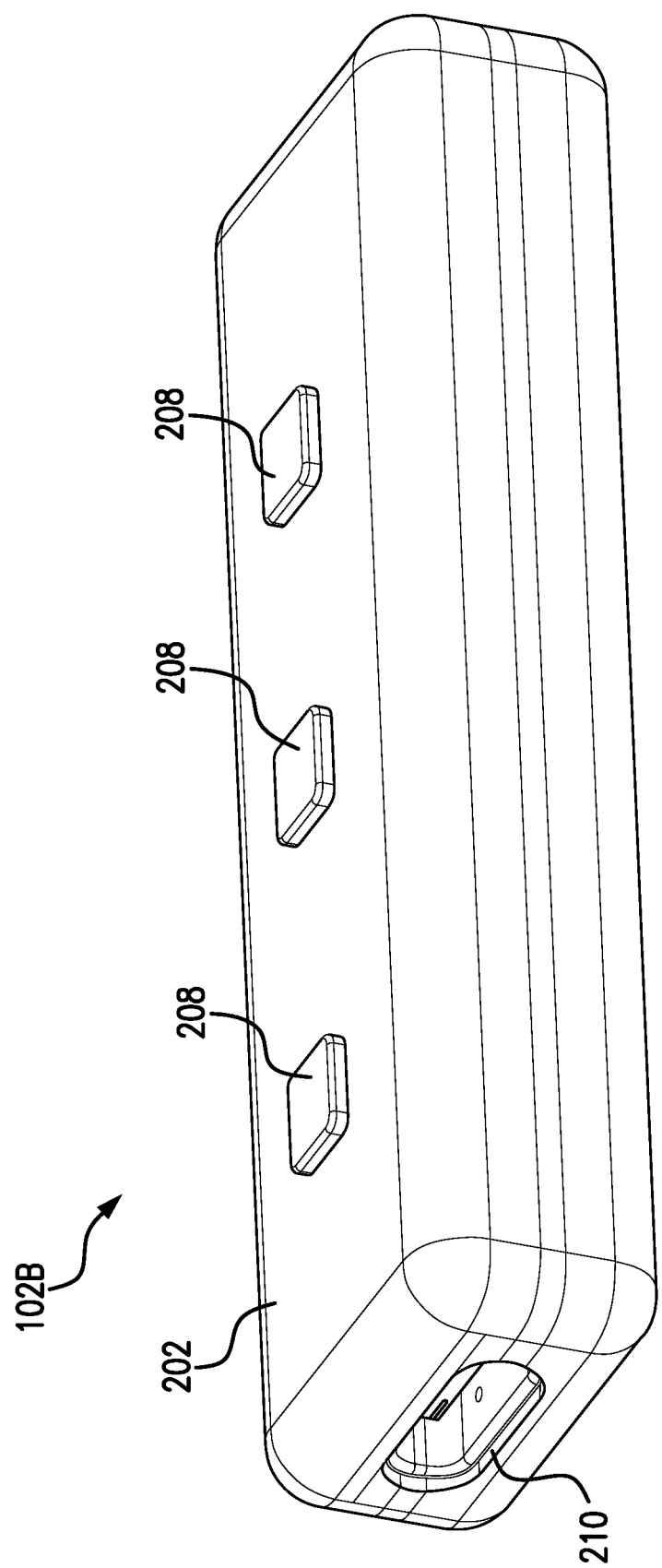
FIGS. 2C and 2D are perspective and exploded views of a pocket device version of a user controller of a writing and/or drawing system embodying aspects of the present invention.
Figure 2D:
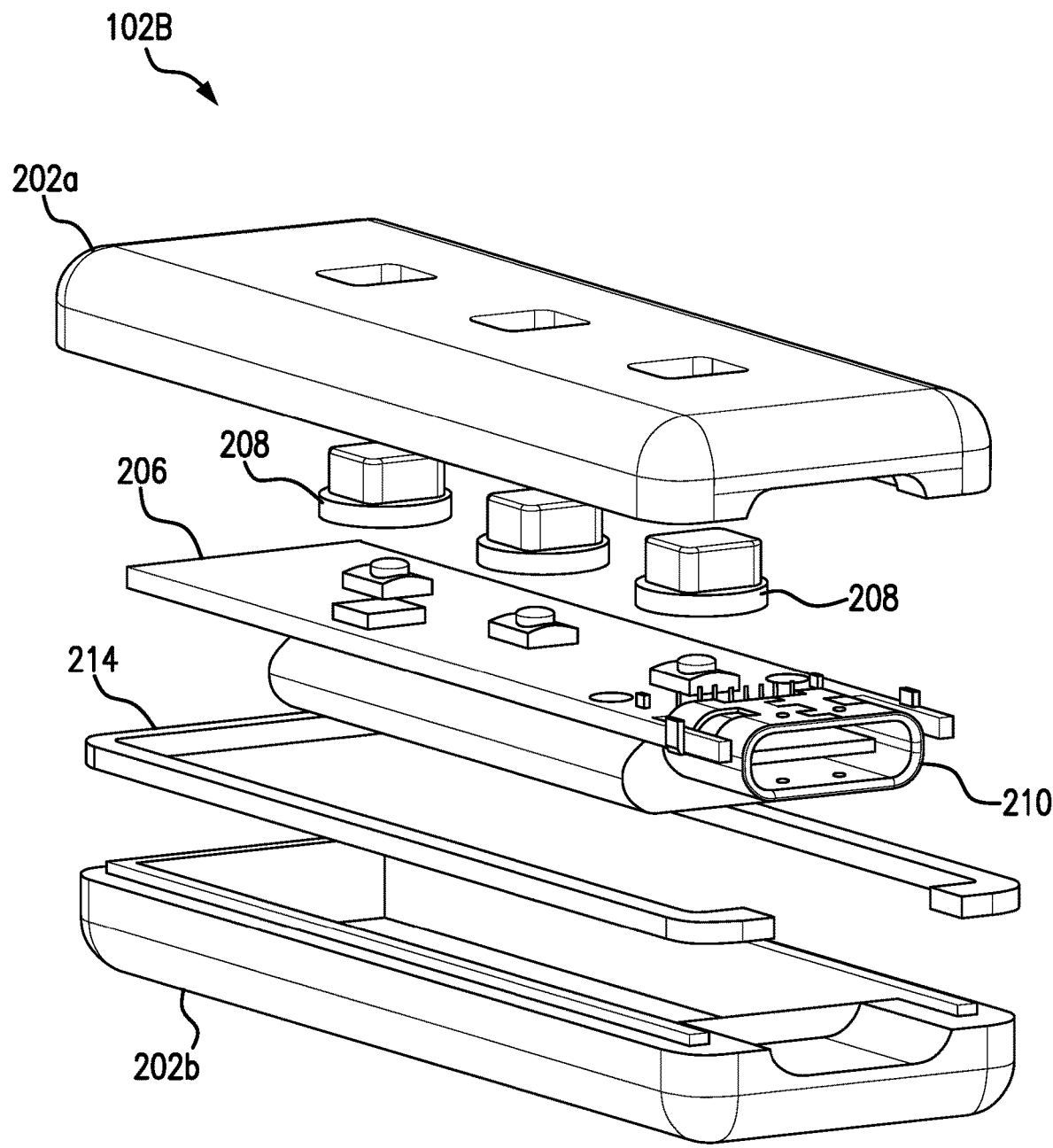

In some embodiments, the one or more UCs 102 may be battery-powered wireless devices. In some embodiments, the UC 102 may be carried by a user when interacting with a display device 106 via the writing and/or drawing software. In some embodiments, a UC 102 may be a pen 102A (as shown in FIGS. 2A and 2B) or a pocket device 102B (as shown in FIGS. 2C and 2D). In some embodiments, the pen 102A may be an enhanced stylus pen with which a user can provide input to touch-enabled screens, and the pocket device 102B may be a portable device (e.g., having a shape and size that makes the pocket device 102 comfortable for a user to carry in a pocket of the user). In some embodiments, the UC 102 may have one or more user inputs 208 (e.g., three buttons). In some embodiments, a user may use a user input 208 (e.g., push a button) to cause execution of a specific operation on one or more screens of the display device 106.

In some embodiments, as shown in FIGS. 2A and 2B, a UC 102 may be a pen 102A that includes a housing 202, a cap 204, a printed circuit board (PCB) 206 on or in which one or more circuit elements may be mounted or fabricated, one or more user inputs 208 (e.g., buttons), a connector 210, and/or a tip 212. In some embodiments, the connector 210 may be, for example and without limitation, a Universal Serial Bus (USB) connector. In some embodiments, the connector 210 may enable a wired connection to an external device, such as a power source (e.g., recharger) and/or a personal computer (e.g., a smartphone). In some embodiments, the tip 212 may be used for writing and/or drawing on the display device 106.

In some alternative embodiments, as shown in FIGS. 2C and 2D, a UC 102 may be a pocket device 102B that includes a housing 202, an end piece 204, a printed circuit board (PCB) 206 on or in which one or more circuit elements may be mounted or fabricated, one or more user inputs 208 (e.g., buttons), a connector 210, and/or a seal 214. In some embodiments, as shown in FIG. 2D, the housing 202 may include first and second portions 202a and 202b. In some embodiments, the connector 210 may be, for example and without limitation, a Universal Serial Bus (USB) connector. In some embodiments, the connector 210 may enable a wired connection to an external device, such as a power source (e.g., recharger) and/or a personal computer (e.g., a smartphone). In some embodiments, a user of the writing and/or drawing system 100 may use the pocket device 102B with a pen native to the display device 106.

Figure 2E:
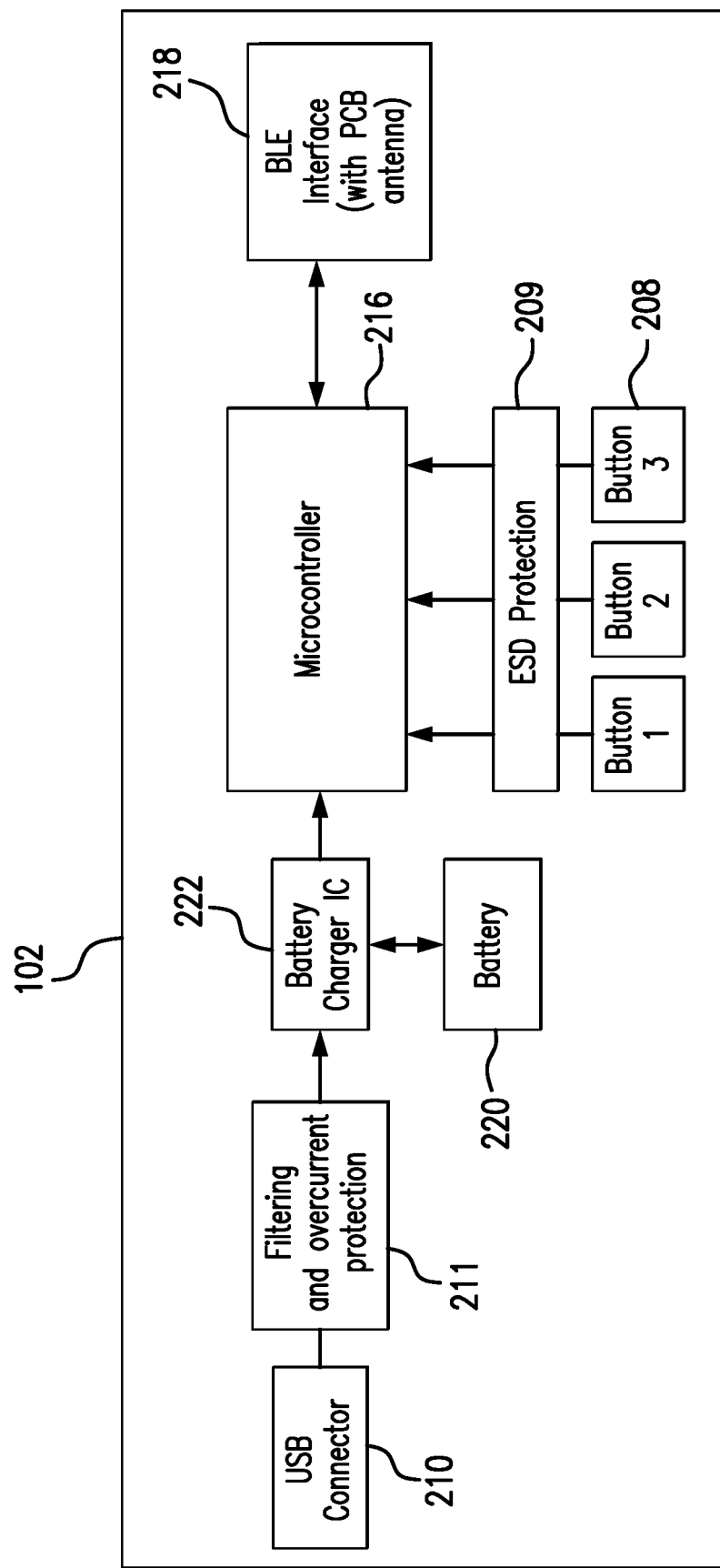
FIG. 2E is a block diagram of a user controller of a writing and/or drawing system embodying aspects of the present invention.

In some embodiments, as shown in FIG. 2E, a UC 102 may include a controller 216 (e.g., a microcontroller) and a communication interface 218. In some embodiments, the communication interface 218 may include a wireless communication interface configured to communicate according to a wireless communication protocol (e.g., a Bluetooth Low Energy (BLE) protocol). In some embodiments, the wireless communication interface may include an antenna. In some embodiments, the UC 102 may be configured use the communication interface 218 to communicate with a sensor 104 connected to a display device 106.

In some embodiments, as shown in FIG. 2E, a UC 102 may include a battery 220 and a charger integrated circuit (IC) 222. In some embodiments, the battery 220 may provide power for one or more components of the UC 102 (e.g., the controller 216 and the communication interface 218). In some embodiments, the charger IC 222 may receive power via the connector 210 and use the power to recharge the battery 220 and/or power one or more components of the UC 102. In some embodiments, the UC 102 may include a filtering and/or overcurrent protection circuit 211 configured to filter the signal received via the connector 210 and/or provide overcurrent protection. In some embodiments, the UC 102 may include an electrostatic discharge (ESD) protection circuit 209 configured to protect the controller 216 from electrostatic discharge received through one or more of the user inputs 208.

1.2 Sensor

Figure 3A:
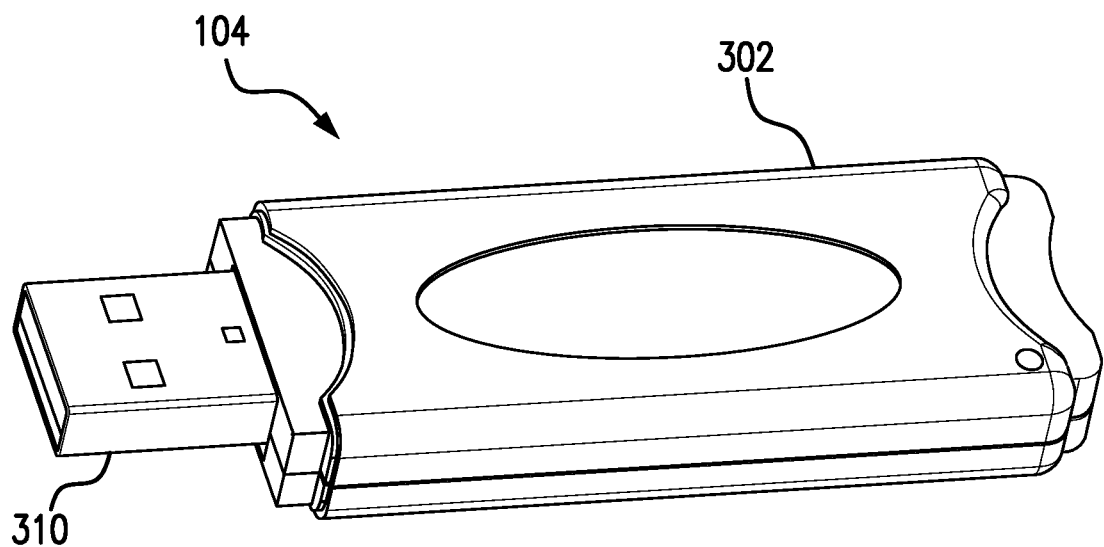
FIGS. 3A and 3B are perspective and exploded views of a sensor of a writing and/or drawing system embodying aspects of the present invention.
Figure 3B:
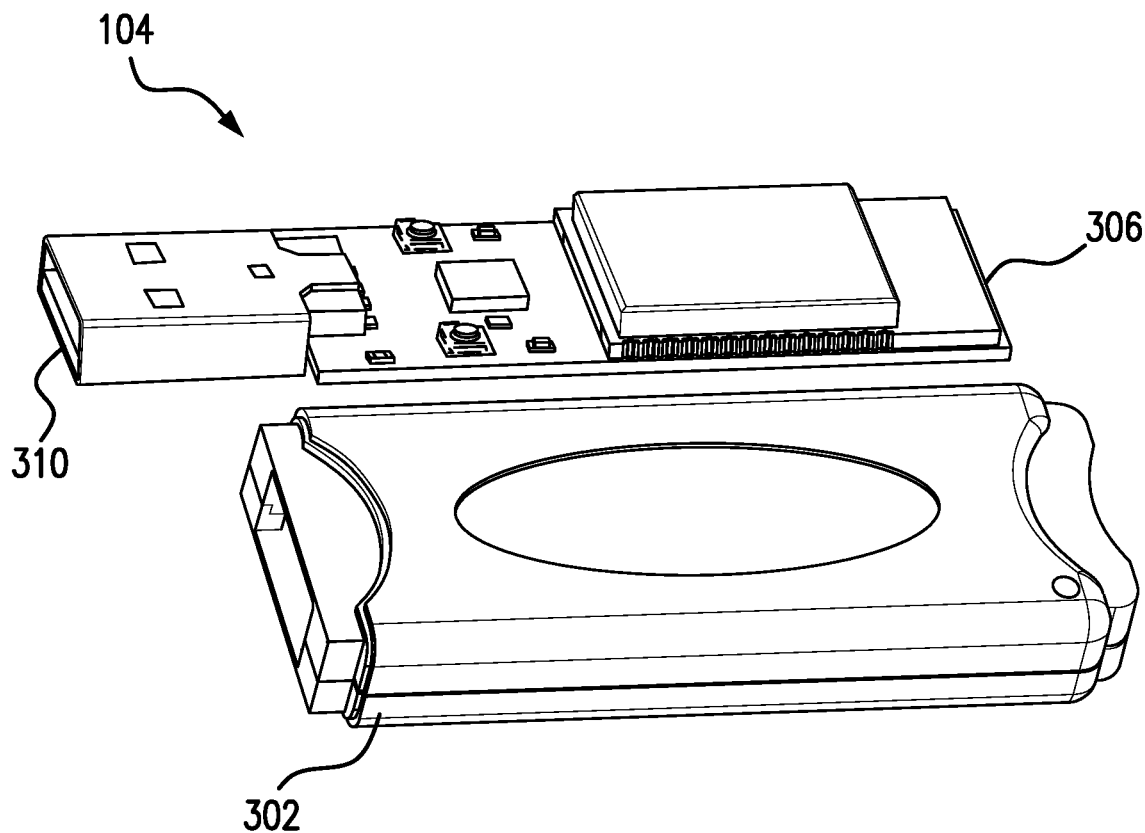

In some embodiments, as shown in FIGS. 3A and 3B, a sensor 104 may include a housing 302, a PCB 306 on or in which one or more circuit elements may be mounted or fabricated, and/or a connector 310. In some embodiments, the connector 310 may be, for example and without limitation, a Universal Serial Bus (USB) connector. In some embodiments, the connector 310 may enable a wired connection from the sensor 104 to an external device, such as a display device 106. In some embodiments, the sensor 104 may receive power from and be powered by the display device 106 through the connector 310. In some embodiments, the sensor 104 may be additionally or alternatively powered by a power source (e.g., a battery) of the sensor 104. In some embodiments, the sensor 104 may be configured to communicate with the display device 106 via the connector 310.

In some embodiments, the sensor 104 may be configured to connect to the one or more computers 114 of the display device 106 via the connector 310. In some embodiments, the one or more computers 114 of the display device 106 may run the writing and/or drawing software.

Figure 3C:
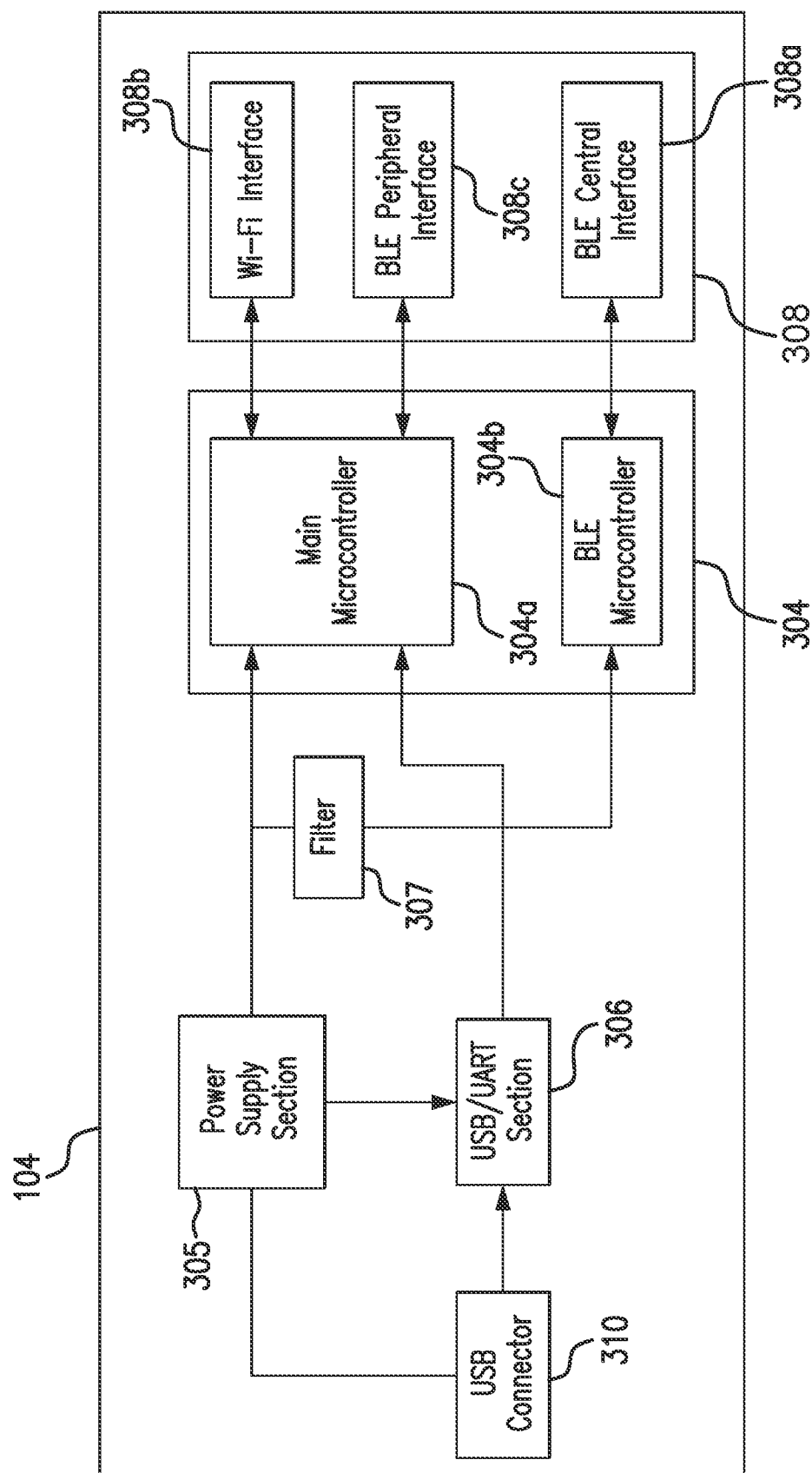
FIG. 3C is a block diagram of a sensor of a writing and/or drawing system embodying aspects of the present invention.
Figure 4:
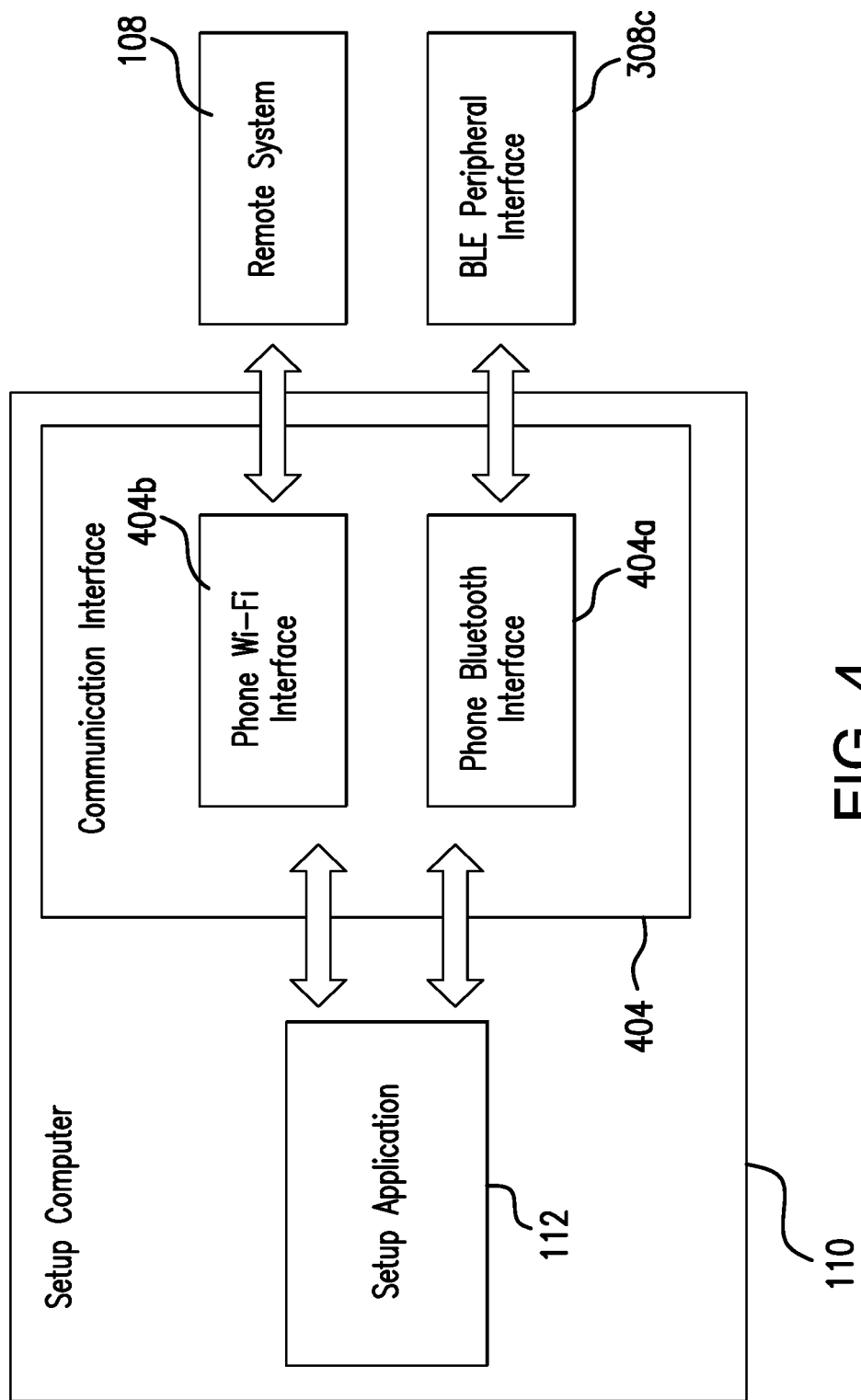
FIG. 4 is a block diagram of a setup computer of a writing and/or drawing system embodying aspects of the present invention.

In some embodiments, as shown in FIG. 3C, the sensor 104 may include a controller 304 and a communication interface 308. In some embodiments, the controller 304 may include a main controller 304a (e.g., a main microcontroller) and a peripheral controller 304b (e.g., a peripheral microcontroller such as, for example and without limitation a BLE microcontroller). In some embodiments, the communication interface 308 may include one or more of a first wireless communication interface 308a configured to communicate according to a first wireless communication protocol, a second wireless communication interface 308b configured to communicate according to a second wireless communication protocol that is different than the first wireless communication protocol, and a third wireless communication interface 308c configured to communicate according to a third wireless communication protocol. In some embodiments, the third wireless communication protocol may be the same as the first wireless communication protocol. In some embodiments, the first wireless communication interface 308a may be a BLE central interface, and the first wireless communication protocol may be, for example and without limitation, a BLE protocol. In some embodiments, the second wireless communication interface 308b may be a Wi-Fi interface, and the second wireless communication protocol may be a Wi-Fi communication protocol (e.g., an IEEE 802.11 communication protocol). In some embodiments, the third wireless communication interface 308c may be BLE peripheral interface, and the third wireless communication protocol may be, for example and without limitation, a BLE protocol. In some embodiments, the first, second, and third wireless communication interfaces 308a-308c may include one or more antennas.

In some embodiments, as shown in FIG. 3C, the controller 304 and communication interface 308 may be separate components of the sensor 104. However, this is not required, and, in some alternative embodiments, a single component may provide the functions of both the controller 304 and communication interface 308. In some embodiments, as shown in FIG. 3C, the peripheral controller 304b and the first wireless communication interface 308a may be separate components of the sensor 104. However, this is not required, and, in some alternative embodiments, a single component may provide the functions of both the peripheral controller 304b and the first wireless communication interface 308a. In some embodiments, as shown in FIG. 3C, the main controller 304a and the second and third wireless communication interfaces 308b and 308c may be separate components of the sensor 104. However, this is not required, and, in some alternative embodiments, a single component may provide the functions of two or more of the main controller 304a and the second and third wireless communication interfaces 308b and 308c.

In some embodiments, the main controller 304a may use the second wireless communication interface 308b to connect to the Internet and communicate with the remote system 108. In some embodiments, the main controller 304a may use the third wireless communication interface 308c to allow users to configure Wi-Fi network credentials and other settings via the setup computer 110 (e.g., a mobile phone or smartphone) running the setup application 112. In some embodiments, the peripheral controller 304b may use the first wireless communication interface 308a to listen on the wireless medium for any nearby UCs 102 and communicate with one or more UCs 102.

In some embodiments, as shown in FIG. 3C, the sensor 104 may include one or more of a power supply section 305, a USB/Universal Asynchronous Receiver/Transmitter (UART) converter 306 between the connector 310 and the main controller 304a, and a filter 307 between the power supply section 305 and the peripheral controller 304b. In some embodiments, the power supply section 305 may receive power from the connector 310 and provide power to components of the sensor 104.

In some embodiments, the sensor 104 does not communicate directly with the computer 114 of the display device 106 to which the sensor 104 is connected via the connector 310. In some embodiments, in order to create a univocal correspondence between a sensor 104 and a display device 106, a web browser cookie may be set on the user browser (UB) of the computer 114 of the display device 106 on which the writing and/or drawing software runs. In some embodiments, this cookie may contain a sensor identification that identifies (e.g., uniquely) the sensor 104 connected to the display device 106. In some embodiments, the cookie containing the sensor identification may allow the writing and/or drawing software to know which sensor 104 is connected to the computer 114 of the display device 106 that the writing and/or drawing software is serving. An example of a procedure to set a browser cookie on the UB of the computer 114 using the remote system 108 is described below. In some alternative embodiments, the sensor 104 may communicate directly with the computer 114 of the display device 106 to which the sensor 104 is connected via the connector 310 (e.g., to provide the writing and/or drawing software running on the computer 114 of the display device 106 with the sensor identification that identifies the sensor 104 connected to the display device 106).

1.3 Setup Application

In some embodiments, the setup application 112 executed by the setup computer 110 may be configured to perform the initial configuration of a sensor 104. In some embodiments, the setup application 112 may be configured to initiate a sequence of events that places the sensor identification that identifies (e.g., uniquely) the sensor 104 connected to the display device 106 on the computer 114 of the display device 106 (e.g., as a cookie on the browser of the computer 114 of the display device 106 to which the sensor 104 is connected).

In some embodiments, the setup computer 110 may include a communication interface 404. In some embodiments, the communication interface 404 may include one or more of a first wireless communication interface 404a configured to communicate according to a first wireless communication protocol and a second wireless communication interface 404b configured to communicate according to a second wireless communication protocol that is different than the first wireless communication protocol. In some embodiments, the first wireless communication interface 404a may be a Bluetooth interface, and the first wireless communication protocol may be, for example and without limitation, a Bluetooth protocol. In some embodiments, the second wireless communication interface 404b may be a Wi-Fi interface, and the second wireless communication protocol may be a Wi-Fi communication protocol (e.g., an IEEE 802.11 communication protocol). In some embodiments, the first and second wireless communication interfaces 404a and 404b may include one or more antennas. In some embodiments, the setup application 112 may use the communication interface 404 of the setup computer 110 to communicate with the remote system 108 (e.g., a web server of the remote system 108) and/or with the sensor 104. In some embodiments, the setup application 112 may communicate with the remote system 108 via an Internet connection using the second wireless communication interface 404b. In some embodiments, the setup application 112 may communicate with the sensor 104 and/or the display device 106 via a BLE connection using the first wireless communication interface 404a.

1.4 Remote System

In some embodiments, the remote system 108 may include one or more computers and one or more data storage devices. In some embodiments, the remote system 108 may be configured to (i) run the writing and/or drawing software, (ii) route UC events (e.g., in-range events and/or user input events) to the writing and/or drawing software instance running on a browser of a computer 114 of given display device 106, and/or (iii) provide storage, organizational tools, and/or collaboration tools for text and drawings made by users via the writing and/or drawing software.

Figure 5:
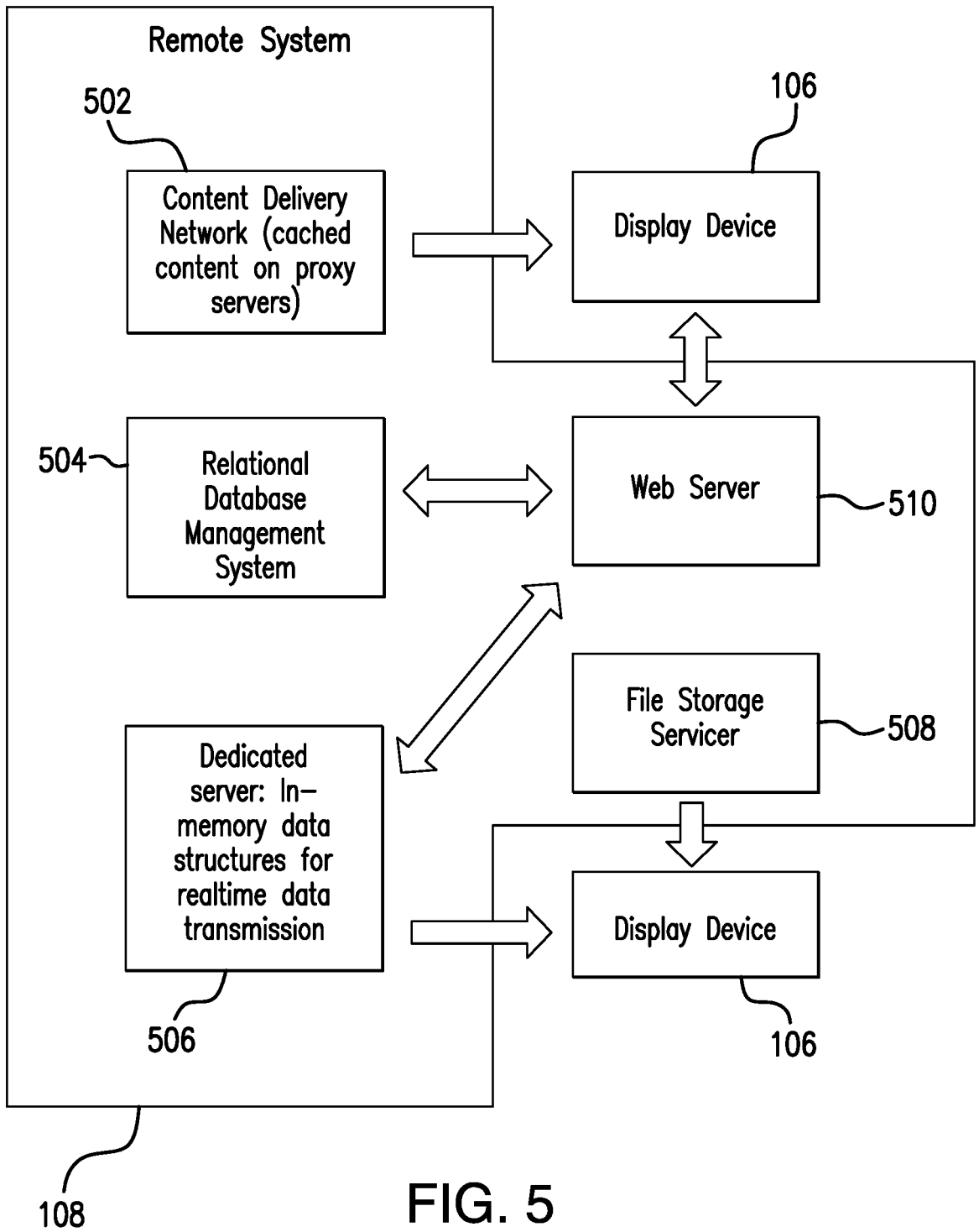
FIG. 5 is a block diagram of a remote system of a writing and/or drawing system embodying aspects of the present invention.

In some embodiments, as shown in FIG. 5, the remote system 108 may include one or more of a content delivery network (CDN) 502, a database management system (DMS) 504, a dedicated server 506, a file storage server 508, and a web server 510. In some embodiments, the CDN 502 may include cached content on one or more proxy servers. In some embodiments, the DMS 504 may be a relational DMS. In some embodiments, the dedicated server 506 may include one or more in-memory data structures for real-time data transmission. In some embodiments, as shown in FIG. 5, one or more of the DMS 504, the dedicated server 506, and the file storage server 508 may communicate with the web server 510. In some embodiments, one or more of the CDN 502, the dedicated server 506, the file storage server 508, and the web server 510 may communicate with one or more display devices 106 (e.g., at least with user browsers on computers 114 of one or more display devices 106).

In some embodiments, the DMS 504 included in the remote system 108 may contain access credentials and other information for one or more registered users. In some embodiments, the DMS 504 may store a correspondence (e.g., a univocal correspondence) between registered users and UCs 102.

In some embodiments, the web server 510 may communicate (e.g., directly) with the sensor 104 (e.g., with the controller 304 of the sensor 104 via the second wireless communication interface 308*b* of the communication interface 308 of the sensor 104). In some embodiments, the web server 510 may communicate with the setup application 112 on the setup computer 110 (e.g., via the second wireless communication interface 404*b* of the communication interface 404 of the setup computer 110). In some embodiments, the web server 510 may communicate with the setup application 112 to initialize the sensor 104. In some embodiments, the web server 510 may control the writing and/or drawing software. In some embodiments, the web server 510 may have read and/or write access to the DMS 504, the file storage server 508, and/or the dedicated server 506.

In some embodiments, writing and/or drawing software may be a set of web pages served by the web server 510. In some embodiments, the set of web pages of the writing and/or drawing software may contain software that runs in a user browser on a computer 114 of a display device 106. In some alternative embodiments, the display device 106 may download the writing and/or drawing software. In some embodiments, a user browser running the writing and/or drawing software may allow a user to draw with a pen (e.g., pen 102*a* of FIGS. 2A and 2B) within with a board specific to the user's account upon arriving in proximity to the display device 106. In some embodiments, after the sensor 104 has been initialized and the writing and/or drawing software has been activated on the display device 106, the computer 114 may open and the display 116 may display a board specific to the user's account without the user taking any action other than approaching the display device 106 with a UC 102. In some embodiments, activating the writing and/or drawing software may include providing the display device 106 (e.g., a computer 114 of the display device 106) with a sensor identification that identifies the sensor 104 connected to the display device 106. In some embodiments, sensor identification may be provided as a cookie on the user browser on the computer 114 of the display device 106 to which the sensor 104 is connected. In some embodiments, the web server 510 of the remote system 108 may use the sensor identification provided to the display device 106 to properly execute actions in response to communications conveyed by the sensor 104 and received by the remote system 108. In some embodiments, the sensor identification may uniquely identify the sensor 104 attached to the display device 106.

1.5 Writing and/or Drawing Software

In some embodiments, the writing and/or drawing software may include user facing software. In some embodiments, the user facing software may be in use when a user is working with the sensor 104 and UC 102. In some embodiments, when a user is engaged in a writing and/or drawing session, the writing and/or drawing software may allow a user to select one or more of color, line width, pencil, eraser, and so on. In some embodiments, the writing and/or drawing software may provide the ability to drag a selection of a drawing to another location. In some embodiments, the user interface of the writing and/or drawing software may allow the user to concentrate on the user's own ideas instead of software options (e.g., by keeping visible options to a minimum). In some embodiments, the writing and/or drawing software may automatically save drawing and writing on the board, erase the board, and lock the screen (e.g., on the display 116 of the display device 106) after the user walks away. In some embodiments, the screen may be locked until another user comes into proximity of the sensor 104. In some embodiments, the writing and/or drawing software may provide one or more menus for one or more features of the writing and/or drawing software. In some embodiments, the writing and/or drawing software may enable a user to (i) save boards with their own custom names, (ii) save as to create a new name for an open board, (iii) access all saved boards on their account (e.g., by tag), (iv) share, download, or delete any of the saved boards, and/or (v) erase the full board with or without saving and/or with or without leaving the "board file" the user is currently in. In some embodiments, the writing and/or drawing software may provide auto shape generation and/or handwriting conversion to typed text. In some embodiments, the writing and/or drawing software may enable a user to quickly switch between pencil (e.g., with a selected or default line width), eraser (e.g., of a selected or default size), and/or color. In some embodiments, the writing and/or drawing software may enable a user to quickly save and open new boards, undo the most recent curve, and/or erase a full board. In some embodiments, the user facing software of the writing and/or drawing software may enable a user to update boards when the user is away from their UC 102 and/or sensor 104.

In some embodiments, the writing and/or drawing software may include a board management interface. In some embodiments, the board management interface may be used by a user, for example and without limitation, when the user is not at the display device 106 (e.g., with a UC 102 in proximity of the sensor 104) and is organizing one or more saved boards on another computer (e.g., a laptop or desktop computer). In some embodiments, the board management interface of the writing and/or drawing software may enable a user to (i) associate one or more tags with each board, (ii) change board names, (iii) download boards, (iv) share boards over the web, (v) delete boards, and/or (vi) open a board. In some embodiments, a tag may be different than a folder at least because a file can have more than one tag. In some embodiments, the writing and/or drawing software may automatically provide one or more useful default tags (e.g., a "Default name" tag) on a board that was automatically saved upon an out-of-range event that occurs when a user's UC 102 is no longer in proximity to the sensor 104. In some embodiments, the default name tag may allow a user to easily track which boards the user might want to name with a custom name. In some embodiments, the tags may include a tag (e.g., a "Stick" tag) that keeps a board on the screen of the display 116 of the display device 106 for an amount of time (e.g., three minutes) after an out-of-range event (e.g., for the sake of avoiding unintentional board save/erase events during extended work sessions). In some embodiments, the tags may include a tag (e.g., a "Default" tag) that causes the writing and/or drawing software to automatically open the tagged file (e.g., board) when the user comes in range (e.g., when an in-range event for the user occurs). The "Default" tag may only be assigned to one file.

2. The User Controller (UC) to Sensor to Remote System to User Browser (UB) Chain of Communication 2.1 User Controller (UC) to Sensor Communication In some embodiments, the UC 102 may use a wireless connection (e.g., a BLE connection) for communication (e.g., encrypted communication) with the sensor 104 according to a first wireless communication protocol (e.g., the BLE protocol). In some embodiments, the UC 102 (e.g., the controller 216 of the UC 102) may use the communication interface 218 to convey packets. In some embodiments, the UC 102 may store a UC identification that identifies the UC 102, and the UC 102 may include the UC identification in packets conveyed by the UC 102. In some embodiments, a sensor 104 may use the communication interface 308 (e.g., the first wireless communication interface 308a of the communication interface 308) to receive packets conveyed by one or more UCs 102 in the proximity of the sensor 104.

2.1.1 UC to Sensor Communication: In Range and Out of Range Events

In some embodiments, a UC 102 may periodically convey advertising packets (e.g., BLE advertising packets) to signal its presence. In some embodiments, the period for packet transmissions may be, for example, 250 milliseconds. In some embodiments, the sensor 104 may continuously scan the wireless medium and receive advertising packets from any nearby UC 102. In some embodiments, the controller 304 of the sensor 104 may receive advertisement packets from one or more UCs 102 via the communication interface 308 (e.g., the first wireless communication interface 308a of the communication interface 308).

In some embodiments, the controller 304 (e.g., the peripheral controller 304b and/or the main controller 304a) of the sensor 104 may determine if one or more UCs 102 are in range of the sensor 104. In some embodiments, the controller 304 may determine that a UC 102 is within range of the sensor 104 if the controller 304 determines that an in range condition is met for the UC 102. In some embodiments, the controller 304 of the sensor 104 may determine whether the UC identification of a UC 102 determined to be in range is in a list of UC identifications for current in range UCs, and the controller 304 may add the UC 102 to the list of UC identifications for current in range UCs if the UC 102 determined to be in range is not in the list of UC identifications for current in range UCs. In some embodiments, the controller 304 may determine that an in range event has occurred with respect to a UC 102 if the controller 304 determines that (i) the UC identification of the UC 102 is not in the list of UC identifications for current in range UCs and (ii) the UC 102 is in range of the sensor 104 (e.g., because the in range condition is met).

In some embodiments, the in-range condition may be the controller 304 receiving one packet from the UC 102. In some embodiments, the packet may be an advertising packet such as, for example and without limitation, a BLE advertising packet. In some alternative embodiments, the in-range condition may be the controller 304 receiving more than one packet (e.g., more than one advertising packet) from the UC 102. For example, in some alternative embodiments, the in-range condition may be the controller 304 receiving from the UC 102 one packet (e.g., advertising packet) in each of N consecutive transmission periods, where N>1 (e.g., in each of two, three, or four consecutive transmission periods). For another example, in some alternative embodiments, the in-range condition may be the controller 304 receiving from the UC 102 one packet (e.g., advertising packet) in at least M of N consecutive transmission periods, where M>1, N>1, and M<N (e.g., in at least 2 of 3 consecutive transmission periods, in at least 3 of 4 consecutive transmission periods, or in at least 3 of 5 consecutive transmission periods). For yet another example, the in-range condition may be the controller 304 receiving from the UC 102 at least N packets (e.g., N advertising packets) in a time period T, where N>2 and T>250 ms (e.g., at least 2 packets in 500 ms, at least 3 packets in 1 second, or at least 4 packets in 1.5 seconds).

In some alternative embodiments, the in-range condition may have a signal strength (e.g., received signal strength indicator (RSSI) or RX) cutoff. In some signal strength cutoff embodiments, the in-range condition may be the controller 304 receiving from the UC 102 one packet (e.g., a BLE advertising packet) having a signal strength (e.g., as indicated by the RSSI value of the packet) above a signal strength threshold (e.g., an RSSI or RX threshold value). In some embodiments, the packet may be an advertising packet such as, for example and without limitation, a BLE advertising packet. In some embodiments, the signal strength threshold may be, for example and without limitation, −90 dBm. However, other signal strength thresholds may be used. In some alternative signal strength cutoff embodiments, the in-range condition may be the controller 304 receiving from the UC 102 more than one packet (e.g., advertising packet) having a signal strength above the signal strength threshold. For example, in some alternative signal strength cutoff embodiments, the in-range condition may be the controller 304 receiving from the UC 102 one packet (e.g., advertising packet) having a signal strength above the signal strength threshold in each of N consecutive transmission periods, where N>1 (e.g., in each of two, three, or four consecutive transmission periods). For another example, in some alternative signal strength cutoff embodiments, the in-range condition may be the controller 304 receiving from the UC 102 one packet (e.g., advertising packet) having a signal strength above the signal strength threshold in at least M of N consecutive transmission periods, where M>1, N>1, and M<N (e.g., in at least 2 of 3 consecutive transmission periods, in at least 3 of 4 consecutive transmission periods, or in at least 3 of 5 consecutive transmission periods). For yet another example, the in-range condition may be the controller 304 receiving from the UC 102 at least N packets (e.g., N advertising packets) having a signal strength above the signal strength threshold in a time period T, where N>2 and T>250 ms (e.g., at least 2 packets in 500 ms, at least 3 packets in 1 second, or at least 4 packets in 1.5 seconds).

In some embodiments, the controller 304 of the sensor 104 (e.g., the peripheral controller 304b and/or the main controller 304a) may determine whether one or more UCs 102 that were previously determined to be within range of the sensor 104 are out of range of the sensor 104. In some embodiments, the UC identifications of one or more UCs 102 that were previously determined to be within range of the sensor 104 may be in the list of UC identifications for current in range UCs. In some embodiments, the controller 304 may determine that a UC 102 that was previously determined to be within range of the sensor 104 is out of range of the sensor 104 if the controller 304 determines that an out of range condition is met for the UC 102. In some embodiments, the controller 304 of the sensor 104 may remove the UC identification of the UC 102 from the list of UC identifications for current in range UCs if the controller 304 determines that the UC 102 is out of range of the sensor 104 (e.g., because the out of range condition is met). In some embodiments, the controller 304 may determine that an out of range event has occurred with respect to a UC 102 if the controller 304 determines that (i) the UC identification for the UC 102 is in the list of UC identifications for current in range UCs and (ii) the UC 102 is out of range of the sensor 104 (e.g., because the out of range condition is met).

In some embodiments, the out of range condition may be the controller 304 not receiving any packets (e.g., advertising packets) from a UC 102 for a threshold amount of time (e.g., 0.25, 0.50, 0.75, 1, 2, or 3 seconds), for each of N consecutive transmission periods, or for at least M of N consecutive transmission periods. In some alternative embodiments, the out of range condition may be the controller 304 not receiving from a UC 102 any packets (e.g., advertising packets) having a signal strength (e.g., as indicated by the RSSI or RX value of the received packet) above a signal strength threshold (e.g., an RSSI or RX threshold value) for a threshold amount of time, for each of N consecutive transmission periods, or for at least M of N consecutive transmission periods. The signal strength threshold may be, for example and without limitation, −90 dBm. However, other signal strength thresholds may be used.

In some embodiments (regardless of whether the out of range condition includes a signal strength threshold), determining that an out of range event has occurred may include one or more steps to reduce the occurrence of false out of range events (e.g., where the controller 304 determines an out of range event to have occurred when the UC 102 has not actually gone out of the proximity of the sensor 104). In some embodiments, reducing false out of range events may include the controller 304 determining whether the signal strength (e.g., RSSI or RX values) of one or more of the packets most recently received by the sensor 104 from the UC 102 before the UC 102 went out of range of the sensor 104 (e.g., as indicated by the out of range condition being met) is similar to the signal strength of one or more of the packets most recently received by the sensor 104 before a true out of range event. In some embodiments, if the signal strength of the one or more of the packets most recently received by the sensor 104 from the UC 102 before the UC 102 went out of range of the sensor 104 is not similar to the signal strength of one or more of the packets most recently received by the sensor 104 before a true out of range event, the controller 304 may confirm that the UC 102 does not come back within range of the sensor 104 for a predetermined amount of time (e.g., 1, 2, 3, 4, or 5 seconds) before determining that an determining that an out of range event has occurred.

In some embodiments, determining that an out of range event has occurred with respect to a UC 102 may include the controller 304 (i) determining a distribution of changes in the signal strength (e.g., RSSI or RX value) of one or more of the packets most recently received by the sensor 104 from the UC 102 before the UC 102 went out of range of the sensor 104 (e.g., as indicated by the out of range condition being met) and (ii) determining whether the current distribution of changes is within a threshold amount (e.g., 200%) of one standard deviation from a mean distribution of changes in the signal strength of one or more of the packets received by the sensor 104 from UCs 102 immediately preceding the UCs 102 going out of range of the sensor 104 in true out of range events. In some embodiments, the distribution of changes may be determined by taking the difference between contiguous strength values to build the delta R values. In some embodiments, the signal strength values for the packets received from the UC 102 in a period of time (e.g., 0.5, 0.75, 1.0, or 2.0 seconds) before the UC 102 went out of range of the sensor 104 to determine the distribution of changes in the signal strength. In some embodiments, the remote system 108 may calculate and convey the standard deviation and the mean of the distribution of the changes in the signal strength of one or more of the packets received by the sensor 104 from UCs 102 immediately preceding the UCs 102 going out of range of the sensor 104 in true out of range events, and the sensor 104 may receive and store the standard deviation and the mean conveyed by the remote system 108.

In some embodiments, if the current distribution of changes is within the threshold amount of the standard deviation from the mean distribution, the controller 304 of the sensor 104 may determine that an out of range event for the UC 102 occurred. However, if the current distribution of changes is not within the threshold amount of the standard deviation from the mean distribution, the controller 304 of the sensor 104 may confirm that the UC 102 does not come back within range of the sensor 104 for a predetermined amount of time (e.g., 1, 2, 3, 4, or 5 seconds) before determining that an out of range event for the UC 102 occurred. In these embodiments that reduce the occurrence of false out of range events, the controller 304 may determine that an out of range event has occurred with respect to a UC 102 if the controller 304 determines that (1) the UC identification of the UC 102 is in the list of UC identifications for current in range UCs, (2) the UC 102 is out of range of the sensor 104 (e.g., because the out of range condition is met), and (3) either (3A) the distribution of changes in the signal strength of packets received from the UC 102 immediately prior to the UC 102 going out of range of the sensor 104 is within the threshold amount of the standard deviation from the mean distribution or (3B) the UC 102 does not reestablish communication with the sensor 104 within the predetermined amount of time.

In some embodiments, the remote system 108 may calculate, for each of the one or more sensors 104 of the writing and/or drawing system 100, a standard deviation and a mean of a distribution of changes in signal strength of one or more of the packets received by the sensor 104 from UCs 102 immediately preceding the UCs 102 going out of range of the sensor 104 in true out of range events. In some embodiments, the remote system 108 may use a machine learning algorithm (e.g., a stochastic machine learning algorithm) to calculate the standard deviation and the mean.

In some embodiments, the environment unique to a given sensor 104 and/or the orientation of a UC 102 relative to a sensor 104 may cause changes in signal strength. In some embodiments, fluctuations in signal strength may additionally occur naturally during operation of the hardware even if the UC 102 does not move. In some embodiments, the remote system 108 may analyze the signal strength of packets received by sensors 104 from UCs 102 to reduce of the occurrence of false in range and/or out of range events (e.g., in which a UC 102 has not actually come into or gone out of the proximity of a sensor 104). In some embodiments, the remote system 108 may calculate the standard deviation and the mean such that changes in signal strength due to true/actual in range and out of range events (in which a UC 102 comes into or goes out of the proximity of a sensor 104) can be distinguished from changes in signal strength due to the environment of the sensor 104, the relative orientation of the UC 102 and sensor 104, and/or the natural fluctuations. In some embodiments, the remote system 108 may use a stochastic machine learning algorithm that can teach itself to ignore signal strength fluctuations due to changes in relative orientation of the UC 102 and sensor 104 and/or environmental factors (e.g., room geometry and/or traffic). In some embodiments, the standard deviation and the mean may be calculated to reduce and/or eliminate false in/out of range events. In some embodiments, the remote system 108 may apply the machine learning algorithm to each sensor 104 individually so as not to mix data from different sensor environments. In some embodiments, machine learning done for a given sensor 104 may have no bearing on the machine learning done for another sensor 104 of the system 100.

In some embodiments, a sensor 104 may convey (e.g., periodically) packets each containing a sensor identification that identifies the particular sensor 104, a signal strength value (e.g., an RSSI or RX value) of a packet received from a particular UC 102, and a UC identifier that identifies the UC 102. In some embodiments, sensor 104 may receive the UC identifier in the packet received from the UC 102 (e.g., using the first wireless communication interface 308a of the communication interface 308). In some embodiments, the controller 304 of the sensor 104 may convey the packets using the communication interface 308 (e.g., using the second wireless communication interface 308b of the communication interface 308).

In some embodiments, the remote system 108 may receive the packets each containing a sensor identification, a signal strength value, and a UC identifier. In some embodiments, the remote system 108 may use UC identifiers received in the packets to avoid irrelevant calculations that would come from comparing signal strength values from different UCs 102 that are in range of a sensor 104. In some embodiments, the remote system 108 may store the sensor identifications, signal strength values, and UC identifiers received in the packets as training data. In some embodiments, the remote system 108 may keep separate collections for each UC 102 from which a sensor 104 receives one or more packets. In some embodiments, the remote system 108 may delete new, incoming data if the remote system 108 has determined that the new data is no longer influencing the machine learning algorithm, and the remote system 108 may begin deleting incoming data to save space as soon as the data is processed.

In some embodiments, the remote system 108 may use the machine learning algorithm to learn what pattern of signal strength values precedes false out of range events and/or what pattern of signal strength values precedes true out of range events. The remote system 108 may accomplish this because the changes in signal strength (e.g., RSSI or RX) values preceding false out of range events (e.g., out of range events caused by signal strength fluctuations due to changes in the relative orientation of the UC 102 and sensor 104 and/or environmental factors) differ from the changes in signal strength preceding a true out or range event (e.g., an out of range event caused by the user of the UC 102 walking away from the sensor 104).

In some embodiments, as the amount of the training data increases, using the machine learning algorithm, the remote system 108 may increase its ability to rule out false out of range events. In some embodiments using the machine learning algorithm, the remote system 108 may internally create a histogram that tracks the distribution of changes in signal strength values ($\Delta R$) immediately preceding an out of range event. In some embodiments, the distribution may be multimodal where each mode (e.g., each range of $\Delta R$ with a high frequency (statistically speaking) of values) represents a different cause of an out of range event. In some embodiments, the histogram may be visualized as a $\Delta R$ horizontal axis and a frequency vertical axis. The algorithm and the underlying $\Delta R$ values may both be discrete, so segments of $\Delta R$ ranges may be used to create bins, and the frequencies may be added up per bin. In some embodiments, the frequency of $\Delta R$ values for a given bin corresponds to how many $\Delta R$ values fall within the range of $\Delta R$ values that are included in the segment of the horizontal access corresponding to that bin.

As the bin width decreases, the likelihood of the bin missing a mode may also decrease. In some embodiments, when the bin width is sufficiently small, using the machine learning algorithm, the remote system 108 may assess which of the modes correspond to false out of range events and/or which of the modes correspond to true out of range events. In some embodiments, to do this, the remote system 108 may take advantage of the vast majority of false out of range events being followed by the UC 102 coming back in range rather quickly (e.g., after the environmental distraction is no longer effecting the signal, or after the UC 102 is no longer rotating). In some embodiments, the remote system 108 may also take advantage of the vast majority of true out of range events not being followed by the UC 102 coming back in range (e.g., at least over the ensuing seconds, assuming the user walked away from the sensor 104 after finishing use of the display device 106). In some embodiments, for a given UC 102, the remote system 108 may convert the last several signal strength values (e.g., the signal strength values for the packets received from the UC 102 in a period of time, such as 1 second, before the out of range event) into $\Delta R$ values, increment the appropriate bins, and then determine whether the UC 102 that has gone out of range of the sensor 104 comes back into range of the sensor 104 within a few seconds. In some embodiments, if the UC 102 does not come back into range, the remote system 108 may increment a tally that tracks the event as a true out of range event. In some embodiments, if instead the sensor 104 starts receiving communications from the UC 102 within a few seconds, the remote system 108 may increment a similar tally that tracks the event as a false out of range event.

In some embodiments, the tallies to track false and true out of range events may be done by creating two histograms. In some embodiments, both histograms may have the same binning that the $\Delta R$ histogram has, but one histogram may keep data for false out of range events, and the other histogram may keep data for true out of range events. In some embodiments, after the remote system 108 has a sufficiently large set of training data for a sensor 104, there may be a unimodal distribution in the histogram for the true out of range events (e.g., where the spread is mostly due to different rates of people walking away).

In some embodiments, the remote system 108 may consider the training data sufficiently large for use (i.e., "converged") when changes in the mean and the standard deviation of the unimodal distribution for the true out of range events have become extremely small with the addition of new entries to the unimodal distribution for true out of range events. In some embodiments, after convergence, the remote system 108 may convey the mean and the standard deviation for the unimodal distribution.

In some embodiments, the controller 304 (e.g., the main controller 304a) of the sensor 104 may receive the mean and the standard deviation for the distribution of changes in signal strength values associated with communications received just before true out of range events using the communication interface 308 (e.g., the second wireless communication interface 308b). In some embodiments, the controller 304 may store the received mean and standard deviation. In some embodiments, the controller 304 (e.g., the main controller 304a) of the sensor 104 may use the mean and standard deviation values to reduce false out of range events.

In some embodiments, the controller 304 of the sensor 104 may calculate $\Delta R$ values (e.g., in real time) for incoming signal strength (e.g., RSSI) values from each UC 102. If the calculated $\Delta R$ values for a UC 102 are not within a certain fraction of the received standard deviation from the received mean $\Delta R$ value (which corresponds to true out of range events), the controller 304 waits to alert the remote system 108 that the UC 108 is out of range until the UC 102 has been sending no packets (or only sub-signal strength threshold packets for signal strength cutoff embodiments) for a predetermined amount of time (e.g., several seconds). In some embodiments, if the in range connection between the UC 102 and the sensor 104 is reestablished within the amount of time (as expected), the sensor 104 may not determine that an out of range event occurred and, therefore, may not inform the remote system 108 of the false out of range event for the UC 102. As a result, the remote system 108 (and therefore the writing and/or drawing software session on a user browser of the display device 106) do not take action based on the false out of range event.

In some embodiments, the mean and the standard deviation for the distribution of changes in signal strength values associated with communications received just before true out of range events calculated for a sensor 104 may be specific to the signal strength threshold being used by the sensor 104 in determining out of range events (or to the condition that sensor 104 is not using a signal strength threshold in determining out of range events). In some embodiments, new values for the mean and standard deviation would need to be calculated if the sensor 104 changes (e.g., increases or decreases) the signal threshold in determining out of range events, starts using a signal strength threshold in determining out of range events, or stops using a signal strength threshold in determining out of range events. In some embodiments, the sensor 104 may inform the remote system 108 whether the sensor 104 is using a signal strength threshold in determining out of range events and, if so, what the signal strength threshold is. In some embodiments, the remote system 108 may use the threshold levels, or the lack thereof, as a parameter for determining whether sub threshold values should be excluded from the training data or whether all values should be used respectively. In some embodiments, the sensor 104 may merely inform the remote system 108 when changes are made with respect to whether a signal strength threshold is being used or to what the signal strength threshold is. In some embodiments, if any changes are made with respect to a signal strength threshold used by a sensor 104 in determining out or range events, the remote system 108 may delete the training data the remote system 108 has previously acquired from the sensor 104 and restart the process of learning the standard deviation and mean values associated with communications received just before true out of range events.

In some embodiments (regardless of whether the in range condition includes a signal strength threshold), similar to determining whether an out of range event has occurred, determining whether an in range event has occurred may include one or more steps to reduce the occurrence of false in range events (e.g., where the controller 304 determines an in range event to have occurred when the UC 102 has not actually come within the proximity of the sensor 104).

2.1.2 User Controller (UC) to Sensor Communication: User Input Events

In some embodiments, when a user activates a user input 208 (e.g., pushes a button) of the UC 102, the UC 102 (e.g., the controller 216 of the UC 102) may convey an identification of the user input 208 (e.g., a numerical value assigned to the user input 208). In some embodiments, the UC 102 may convey the identification of the user input 208 with the UC identification that identifies the UC 102. In some embodiments, the UC 102 may convey the identification of the user input 208 and the UC identification using the communication interface 218.

In some embodiments, the sensor 104 (e.g., the controller 304 of the sensor 104) may receive the identification of the user input 208 and the UC identification that identifies the UC 102 from which the identification of the user input 208 and the UC identification were conveyed. In some embodiments, the sensor 104 may receive the identification of the user input 208 and the UC identification using the communication interface 308 (e.g., the first wireless communication interface 308a, which may be a BLE central interface). In some embodiments, if the sensor 104 receives an identification of a user input 208, the sensor 104 (e.g., the controller 304 of the sensor 104) may determine that a user input event has occurred.

In some embodiments, the sensor 104 may establish a connection (e.g., a BLE connection) with the UC 102 after the UC 102 reports (e.g., via its advertising packets) that a user input 208 has been activated. In some embodiments, after the connection has been established, the sensor 104 may request the UC 102 to identify which user input 208 has been activated, and the UC 102 may respond with the identification of the user input 208. In some embodiments, the sensor 104 may close the connection after receiving the identification of the user input 208.

2.2 Sensor to Remote System Communication

In some embodiments, when the controller 304 of the sensor 104 receives packets conveyed by one or more UCs 102 in the proximity of the sensor 104, the controller 304 may identify in each packet a UC identification that identifies the UC 102 that conveyed the packet. In some embodiments, the controller 304 may identify for each packet a signal strength value (e.g., an RSSI or RX value). In some embodiments, for each packet that contains an identification of a user input 208 of the UC 102 that conveyed the packet, the controller 304 may identify the identification of the user input 208. In some embodiments, the peripheral controller 304b (e.g., BLE microcontroller) may receive the packets conveyed by one or more UCs 102 in the proximity of the sensor 104, and the peripheral controller 304b may identify in each packet the UC identification, the signal strength value, and an identification of a user input 208 (if present in the packet). In some embodiments, the peripheral controller 304b may pass the UC identification and the identification of a user input 208 (if present) to the main controller 304a. In some embodiments, the peripheral controller 304b may additionally pass the signal strength value to the main controller 304a.

In some embodiments, if the controller 304 of the sensor 104 determines that an in range event has occurred with respect to a UC 102, the controller 304 (e.g., the main controller 304a) of the sensor 104 may use the communication interface 308 (e.g., the second wireless communication interface 308b of the communication interface 308, which may be a Wi-Fi interface) to convey the received UC identification that identifies the UC 102, a sensor identification that identifies the sensor 104, and an indication that an in range event occurred (e.g., in an information packet). In some embodiments, if the controller 304 (e.g., the peripheral controller 304b) of the sensor 104 determines that an out of range event has occurred with respect to a UC 102, the controller 304 (e.g., the main controller 304a) of the sensor 104 may use the communication interface 308 (e.g., the second wireless communication interface 308b of the communication interface 308) to convey the received UC identification that identifies the UC 102, a sensor identification that identifies the sensor 104, and an indication that an out of range event occurred (e.g., in an information packet). In some embodiments, if the controller 304 (e.g., the peripheral controller 304b) of the sensor 104 determines that a user input event has occurred with respect to a UC 102, the controller 304 (e.g., the main controller 304a) of the sensor 104 may use the communication interface 308 (e.g., the second wireless communication interface 308b of the communication interface 308) to convey the received UC identification that identifies the UC 102, a sensor identification that identifies the sensor 104, and the received identification of the user input 208 of the UC 102 (e.g., in an information packet). In some embodiments, the remote system 108 may receive the information (e.g., the UC identification, the sensor identification, and the event type indication) conveyed by the sensor 104. In some embodiments, the controller 304 (e.g., the main controller 304a) of the sensor 104 may perform encrypted communication (e.g., over WiFi) with the remote server 108. In some embodiments, the sensor 104 and remote server 108 may communicate using a WebSocket application programming interface (API).

In some embodiments, for all in range, out of range, and user input events, the peripheral controller 304b of the sensor 104 may pass the event type indication (in range indication, out of range indication, or the identification of the user input 208) and the UC identification to the main controller 304a of the sensor 104. In some embodiments, the controller 304 (e.g., the main controller 304a) may concatenate the event type indication and UC identification with sensor identification that identifies the sensor 104. In some embodiments, the sensor identification may be stored on the sensor 104. In some embodiments, the main controller 304a may convey the information in one or more packets that are sent over a WebSocket connection to the web server 510 of the remote system 108. In some embodiments, this packet of information may be a WebSocket packet. In some embodiments, the packet may contain the UC identification that identifies the UC 102 and was received by the sensor 104, the sensor identification that identifies the sensor 104, and an event indication that indicates the type of event that occurred (an in range event, an out of range event, or a user input event in which an identified one of the one or more user inputs 208 was used).

2.3 Remote System to Display Device Communication

In some embodiments, the remote system 108 may associate each of the UC identifications that identify the UCs 102 of the system 100 with a user identification that identifies a user of the system 100. In some embodiments, if a user owns multiple UCs 102, the multiple UC identifications may be associated with the user identification of the user. In some embodiments, if a new UC 102 for the first time comes within range of a sensor 104 that is attached to a display device 106 that is running writing and/or drawing software, the remote system 108 may receive the UC identification that identifies the new UC 102 (e.g., in a packet conveyed by the sensor 104 that additionally includes a sensor identification that identifies the sensor 104 and an indication that an in range event occurred). In some embodiments, the remote system 108 may recognize that the UC identification that identifies the new UC 102 is not yet associated with a user. In some embodiments, when this happens, the remote system 108 may route the writing and/or drawing software running on the display device 106 to which the sensor 104 is attached to a screen for entering the user's credentials, and the remote system 108 may receive the entered user credentials from the display device 106 and associate the UC identification that identifies the new UC 102 with the user identification that identifies the user (as indicated by the user's credentials).

In some embodiments, when the web server 510 of the remote system 108 receives a packet (e.g., a WebSocket packet) conveyed by a sensor 104, the web server 510 may save the incoming data on the dedicated server 506 that includes one or more in-memory data structures for real-time data transmission. In some embodiments, the writing and/or drawing software running on a computer 114 of a display device 106 (e.g., on a user browser of the computer 114) may be continuously connected to the web server 510 on the remote system 108 (e.g., using a WebSocket connection that is distinct from the WebSocket connection between the web server 510 and the sensor 104).

In some embodiments, when the in-memory structures for real-time data transmission of the dedicated server 506 of the remote system 108 are updated by a packet conveyed by a sensor 104, the web server 510 of the remote system 108 may use the sensor identification that identifies the sensor 104 that conveyed the packet to identify an active writing and/or drawing software session on a user browser of a computer 114 of a display device 106 to which the sensor 104 is connected. In some embodiments, the web server 510 of the remote system 108 may use the received sensor identification to identify an active writing and/or drawing software session by finding a browser cookie that contains the sensor identification. In some embodiments, the remote system 108 may use a WebSocket connection between the remote system 108 and the writing and/or drawing software running on a computer 114 of a display device 106. In some embodiments, when the remote system 108 receives a packet conveyed by the sensor 104, the web server 510 of the remote system 108 may additionally or alternatively search the DMS 504 of the remote system 108 for the user identification associated with the UC identification received in the packet conveyed by the sensor 104.

In some embodiments, after the web server 510 identifies (i) the writing and/or drawing software running on a computer 114 of a display device 106 to which the sensor 104 identified by the received sensor identification is connected and (ii) the user identification associated with the received UC identification, the remote system 108 may provide the writing and/or drawing software running on a computer 114 of a display device 106 to which the sensor 104 identified by the received sensor identification is connected with access to information in a user account associated with the user identification. In some embodiments, the remote system 108 may additionally or alternatively cause the writing and/or drawing software running on a computer 114 of a display device 106 to which the sensor 104 identified by the received sensor identification is connected to carry out one or more actions indicated by the packet conveyed by the sensor 104 (e.g., by an event indication included in the packet). In some embodiments, the remote system 108 may create an open line of communication to the writing and/or drawing software (e.g., via the WebSocket connection between the remote system 108 and the writing and/or drawing software) triggered by a UC 102 in proximity to the sensor 104 and user input events on the UC 102. In some embodiments, the remote system 108 may allow, for example, the writing and/or drawing software running on a computer 114 of a display device 106 to which the sensor 104 is connected to make available to the user all of the user's work history and settings in response to an in range event that has occurred with respect to a user's UC 102. In some embodiments, the remote system 108 may cause the writing and/or drawing software running on the computer 114 of the display device 106 to which the sensor 104 is connected to display on the display 116 of the display device the user's work history, a user-specific welcome message, and/or an open drawing session in response to an in range event that has occurred with respect to a user's UC 102. In some embodiments, the writing and/or drawing software may display the user-specific information before the user even gets to within several feet of the display device 106.

In some embodiments, to maximize user control, after a sensor 104 has determined that an in range event has occurred with resect a UC 102 of one user, the writing and/or drawing software may hold one or more users whose UCs 102 subsequently come in range of the sensor 104 in a queue accessible from a menu provided by the writing and/or drawing software. In some embodiments, the first user may open the menu and accept one or more of the subsequent in range users, which may allow the one or more accepted subsequent users to be included in the writing and/or drawing software session. In some embodiments, when a writing and/or drawing software session includes more than one user, the system 100 may respond to user input events from the UCs 102 of all the users included in the session. Accordingly, some user input events, such as those that cause actions that affect the writing and/or drawing software session (e.g., an undo operation), may affect all included users. However, other user input events may only affect one user. For example, a user can have the current state of the board saved to only that user's account. For another example, a copy request from a UC 102 associated with a user would only be associated with the user of that UC 102. In some embodiments, a copy event may be handled by the writing and/or drawing software capturing the current state of the board for the account of the user associated with the UC 102 from which the copy event was generated, and the writing and/or drawing software may subsequently paste the appropriate board when a paste event comes in from a UC 102 associated with the user.

In some embodiments, when the UC 102 of a user comes into range of a sensor 104, and the sensor 104 notifies the remote system 108 of an in range event with respect to the UC 102, the web server 510 of the remote system 106 may automatically welcome the particular user associated with the UC identification of the UC 102 by username, unlock the writing and/or drawing software, and/or wait for the user to engage with the writing and/or drawing software. In some embodiments, when a user input 208 of a UC 102 is activated (e.g., a button is pushed), the web server 510 of the remote system 108 may determine what user preset action is associated with the activated user input 208 (e.g., as identified by the user input identification conveyed by a sensor 104 and received by the remote system 108) and transmit the preset action to the writing and/or drawing software on the display device 106, which carries out the indicated action (e.g., toggle between pencil and eraser, undo last mark, copy board, and paste board). In some embodiments, when a user goes out of range (e.g., as indicated by the sensor 104 determining that an out of range event has occurred with respect to the UC 102 of the user), the remote system 108 may automatically cause the writing and/or drawing software to retrieve the screen content on the display device 106 and transmit it to the remote system 108. In some embodiments, the remote system 108 may then save the user's work to the user's account (e.g., using a filename made up of the user's name concatenated with the date and local time). In some embodiments, the remote system 108 may additionally or alternatively automatically cause the writing and/or drawing software to erase the screen content on the display device 106 and cause the writing and/or drawing software to be locked until another user comes into range of the sensor 104 (e.g., as indicated by the sensor 104 determining that an in range event has occurred with respect to a UC 102 of the user). In some embodiments, if more than one user is in range and one user leaves, the screen content may be automatically saved only for the leaving user, and the writing and/or drawing software session may remain open as is for the remaining user(s).

3. Connecting the Sensor and the User Browser on the Display Device

In some embodiments, when a user first uses the sensor 104, the sensor 104 may need to be initialized. In some embodiments, before initializing the sensor 104, the user may log into the writing and/or drawing software executed by the computer 114 of the display device 106. In some embodiments, the log on event may establish a connection between the writing and/or drawing software on the computer 114 of the display device 106 (e.g., on a user browser of the computer 114 of the display device 106) and the remote system 108. In some embodiments, the connection between the writing and/or drawing software and the remote system 108 may be an API connection. In some embodiments, the remote system 108 may know that the log on was made from the log on screen of the writing and/or drawing software (as opposed to a log on made from a website homepage).

In some embodiments, if the remote system 108 confirms the credentials and determines that there is no sensor identification that identifies a sensor 104 connected to the display device 106 on the computer 114 of the display device 106 (e.g., that there is no cookie including a sensor identification on the browser of the computer 114 of the display device 106 to which the sensor 104 is connected), the remote system 108 may initiate a separate session including opening a connection (e.g., a WebSocket connection) between the remote system 108 and the computer 114 of the display device 106 (e.g., between the remote system 108 and a user browser on the computer 114). In some embodiments, the remote system 108 may store an identification of the display device 106 (e.g., an IP address from which the API log in connection came or a WebSocket identifier) along with the username associated with the log in to the writing and/or drawing software (e.g., on the dedicated server 506 that includes one or more in-memory data structures for real-time data transmission). In some embodiments, storing the identification of the display device 106 and the username on remote system 108 provides the remote system 108 (e.g., the dedicated server 506) with knowledge of the user browser on the computer 114 of the display device 106 that the user is working on and the user's name.

In some embodiments, using the connection (e.g., the API connection) between the writing and/or drawing software and the remote system 108 established by the log in, the remote system 108 may cause the writing and/or drawing software to display instructions on the display 116. In some embodiments, the remote system 108 may provide a time period (e.g., 10 minutes) during which the user must follow the instructions. In some embodiments, the writing and/or drawing software may display a countdown showing the time remaining for the user to complete the instructions.

In some embodiments, the instructions may instruct the user to download the setup application 112 (e.g., onto the setup computer 110) and log in to the setup application 112 using the same credentials used to log in to the writing and/or drawing software. In some embodiments, the log in event may cause a connection (e.g., an API connection) to be established between the setup application 112 and the remote system 108 (e.g., using the second wireless communication interface 404b of the setup computer 110). In some embodiments, if the remote system 108 confirms the credentials to be valid, the user is logged into the setup application 112.

In some embodiments, the user may use the setup application 112 on the setup computer 110 to select the sensor 104 connected to the display device 106 that the user used to log in to the writing and/or drawing software. In some embodiments, the sensor 104 connected to the display device 106 on which the user is working may be the sensor 104 that is closest to the user's setup computer 110. In some embodiments, the nearest sensor 104 may be isolated by the setup application 112 using the signal strength (e.g., as indicated by RSSI or RX values) from any surrounding sensors 104. In some embodiments, when the user selects the sensor 104 connected to the display device 106 that the user is using, the setup application 112 may connect to that sensor 104 (e.g., using the first wireless communication interface 404a of the setup computer 110). In some embodiments, the setup application 112 may receive from the sensor 104 the sensor identification that identifies the sensor 104. In some embodiments, the setup application 112 may convey the received sensor identification to the remote system 108 (e.g., using the second wireless communication interface 404b of the setup computer 110).

In some embodiments, the remote system 108 may receive from the setup application 112 the sensor identification that identifies sensor 104 connected to the display device 106 that the user used to log into the writing and/or drawing software. In some embodiments, the remote system 108 may use the username received from the setup application 112 to find the user's record in the dedicated server 506 of the remote system 108 that includes one or more in-memory data structures for real-time data transmission. In some embodiments, the remote system 108 may add the received sensor identification to the user's record, and the IP address of the involved computer is read from the record in the dedicated server 506.

In some embodiments, using the received identification of the display device 106 (e.g., an IP address from which the API log in connection came or a WebSocket identifier), the remote system 108 may convey the sensor identification to the display device 106. In some embodiments, the remote system 108 may convey the sensor identification in a cookie for the user browser of the computer 114 of the display device 106.

In some embodiments, with the setup application 112 on the setup computer 110 still connected to the remote system 108, the remote system 108 may use the sensor identification to look up password credentials for the sensor 104 (e.g., in the database management system 504 of the remote system 108). In some embodiments, the database management system 504 of the remote system 108 may have been populated with the sensor identifications and associated passwords (e.g., before shipping the sensors 104). In some embodiments, the remote system 108 may convey the sensor password to the setup application 112, and the setup application may convey the sensor password to the sensor 104. In some embodiments, the sensor 104 may use the password to establish a communication session (e.g., an API session) with the remote system 108 for reporting activity with UCs 102 (e.g., in range events, out of range events, and user input events).

In some embodiments, the remote system 108, which may have received the sensor identification from the setup application 112 along with the username received by the remote system 108 when the user signed into the setup application 112, may use the username to retrieve the identification of the display device 106 (e.g., an IP address from which the API log in connection came or a WebSocket identifier) from the dedicated server 506 of the remote system 108 that includes one or more in-memory data structures for real-time data transmission. In some embodiments, the identification of the display device 106 may inform the remote system 108 of the connection (e.g., WebSocket connection) that was established with the display device 106 (e.g., with a user browser of the computer 114 of the display device 106) to send the sensor identification to the display device 106 (e.g., to the user browser in a cookie). In some embodiments, the sensor identification completes the in-memory database record pairing an identification of a display device 106 (e.g., an IP address or a WebSocket identifier) to a sensor identification. In some embodiments, the sensor 104 may convey its sensor identification to the remote system 108 along with a UC identification. In some embodiments, the remote system 108 may use the connection (e.g., the WebSocket connection) between the remote system 108 and the display device 106 to cause the writing and/or drawing software to take appropriate action on the display device 106 (e.g., on the user browser's writing and/or drawing software) based on activity of one or more UCs 102. In some embodiments, this may be accomplished because the remote system 108 may use the sensor identification that identifies the sensor 104 to find the identification (e.g., IP address or WebSocket identifier) of a display device 106 in the in-memory database in the dedicated server 506. In some embodiments, the remote system 108 may use the identification of the display device 106 to determine where to send the action item based on the event type indication that the sensor 104 conveyed to the remote system 108 along with the sensor identification that identifies the sensor 104 and the UC identification that identifies UC 102 and from which the associated user can be determined.

In some embodiments, the user may repeat the initialization process if the user changes the display device 106 to which the sensor 104 is connected (e.g., moves the sensor 104 to a different display device 106).

In some embodiments, the remote system 108 may update the user's entry in the database for in-memory data structure to include the sensor identification. In some embodiments, the identification of the display device 106 (e.g., IP address or WebSocket identification) and the sensor identification in this data structure may allow the remote system 108 to use the connection (e.g., WebSocket connection) to automatically respond on the writing and/or drawing software on the display device 106 when users come in and out of range or activate user inputs 208 on the UC 102. In some embodiments, this may be possible because the UC 102 may send to the sensor 104 transmissions that inform the sensor 104 of all possible UC activities (e.g., identifications of the different user inputs 208) and include the UC identification of the UC 102. The sensor 104 may pass the event information and UC identification, along with the sensor identification to the remote system 108. In some embodiments, the remote system 108 may use the UC identification to look up a username associated with the UC identification. However, if it is a new UC 102, the remote system 108 may ask for the user's credentials to create the database association between the UC identification and the user's username. In some embodiments, the remote system 108 may use the sensor identification to retrieve the identification of the display device 106 (e.g., IP address or WebSocket identifier) that the user is using and to which the sensor 104 is connected. In some embodiments, the remote system 108 may use the sensor identification to identify a browser of the computer 114 of the display device 106 that the user is using and to which the sensor 104 is connected.

4. Display Device

In some embodiments, the display device 106 may include an electronic screen with touch technology and network connectivity (e.g., Internet connectivity via a wired and/or wireless communication interface). In some embodiments, the display device 106 may be used as a writing and/or drawing surface, and the contents of the writing and/or drawing surface may be synchronized with the remote system 108. In some embodiments, the display device 106 may allow users to write and/or draw arbitrary lines on its surface. In some embodiments, the display device 106 may provide standard tools and settings for electronic drawing boards, such as, for example and without limitation, eraser and pencil with configurable thickness and color. In some embodiments, the display device 106 (e.g., the computer 114 of the display device 106) may be configured to run writing and/or drawing software. In some embodiments, the writing and/or drawing software may run in a user browser of the computer 114 of the display device 106. In some embodiments, the writing and/or drawing software running on the display device 106 may be a set of web pages served by the web server 510 of the remote system 108.

Figure 6A:
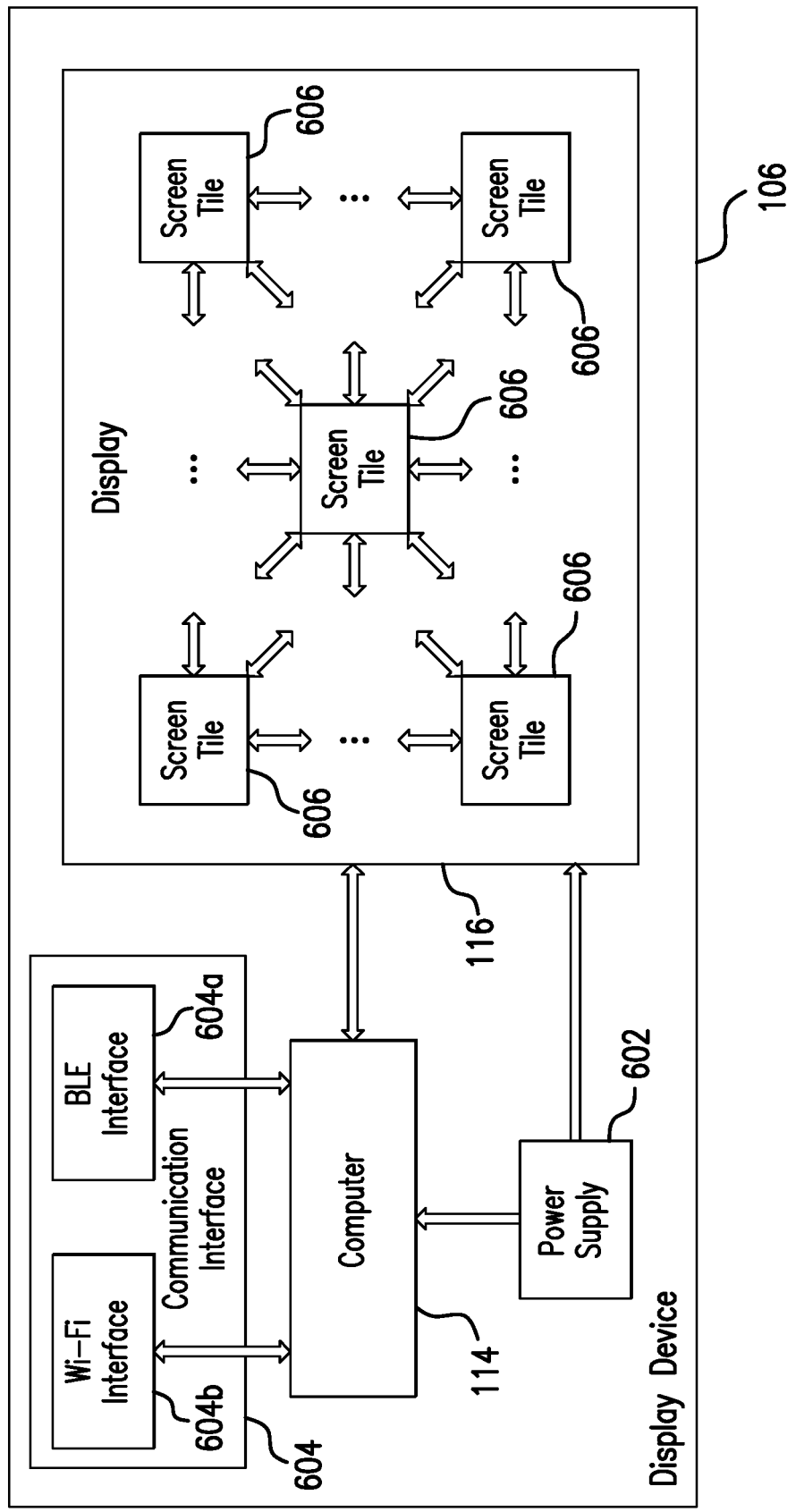
FIG. 6A is a block diagram of a display device of a writing and/or drawing system embodying aspects of the present invention.

In some embodiments, as shown in the FIG. 1, the display device 106 may include one or more computers 114 and one or more displays 116. In some embodiments, the one or more displays 116 may include one or more touchscreens. In some embodiments, as shown in the FIG. 6A, the display device 106 may additionally include one or more of a power supply 602 and a communication interface 604. In some embodiments, as shown in the FIG. 6A, the display 116 may include screen tiles 606. In some embodiments, the screen tiles 606 may be a set of screens that are tiled together. In some embodiments, the one or more computers 114 may act as a master controller that controls the operation of a display 116 having multiple screen tiles 606 as a single logical unit. In some embodiments, the one or more computers 114 may be connected to the remote system 108 using the communication interface 604, and the one or more computers 114 may handle the transfer of screen content data between the remote system 108 and the display 116 (e.g., between the remote system 108 and each of the screen tiles 606 of the display 116).

In some embodiments, the power supply 602 may draw electrical power from an AC source, perform AC to DC conversion, and route DC power to the one or more computers 114, the communication interface 604, and the display 116. In embodiments where the display 116 includes screen tiles 606, the power supply 602 may supply power to each of the screen tiles 606.

In some embodiments, the communication interface 604 may include one or more of a first wireless communication interface 604a configured to communicate according to a first wireless communication protocol and a second wireless communication interface 604b configured to communicate according to a second wireless communication protocol that is different than the first wireless communication protocol. In some embodiments, the first wireless communication interface 604a may be a Bluetooth interface, and the first wireless communication protocol may be, for example and without limitation, a Bluetooth protocol. In some embodiments, the second wireless communication interface 604b may be a Wi-Fi interface, and the second wireless communication protocol may be a Wi-Fi communication protocol (e.g., an IEEE 802.11 communication protocol). In some embodiments, the first and second wireless communication interfaces 604a and 604b may include one or more antennas. In some embodiments, the one or more computers 114 may use the communication interface 604 of the display device 106 to communicate with the remote system 108 (e.g., a web server of the remote system 108). In some embodiments, the one or more computers 114 may communicate with the remote system 108 via an Internet connection using the second wireless communication interface 604b. In some embodiments, the one or more computers 114 may communicate with the setup computer 110 via a BLE connection using the first wireless communication interface 604a (e.g., for configuring the access credentials for the local Wi-Fi network). In some embodiments, when an Internet connection (e.g., Wi-Fi connection) is in place, the one or more computers 114 may connect to the remote system 108, which may provide online storage for user drawings, so that these drawings can be synchronized between the display device 106 and the remote system 108.

In some embodiments, the screen tiles 606 may be attached to a mechanical structure of the display device 106. In some embodiments, the display device 106 may be a vertical structure that can be fixed to an interior wall of a building. In some embodiments, the display device 106 may include an outer frame (e.g., a rectangular frame) that covers the outer borders of the display device 106 to hold the structure (e.g., screen tiles 606) of the display device 106 together. In some embodiments, the outer frame may include vertical arms and horizontal arms. In some embodiments, the mechanical structure may include horizontal bars attached to the vertical arms of the outer frame. In some embodiments, the horizontal bars may run through the width of the display 116 in the horizontal direction. In some embodiments, the number of horizontal bars may be equal to the number of the rows of screen tiles 606 minus one. In some embodiments, the horizontal bars, along with the horizontal and vertical arms of the outer frame, may provide a mechanically stable attachment surface for the screen tiles 606 of the display 116.

In some embodiments, the screen tiles 606 may be attached to the frame and horizontal bars of the mechanical structure in an array including one or more rows and one or more columns of screen tiles 606. In some embodiments, each of the screen tiles 606 in the uppermost row of screen tiles 606 may be attached to the upper horizontal arm of the frame at the upper edge of the screen tile 606 (e.g., at the upper corners of the screen tile 606) and to a horizontal bar at the lower edge of the screen tile 606 (e.g., at the lower corners of the screen tile 606). In some embodiments, each of the screen tiles 606 in the lowermost row of screen tiles 606 may be attached to a horizontal bar at the upper edge of the screen tile 606 (e.g., at the upper corners of the screen tile 606) and to the lower horizontal arm of the frame at the lower edge of the screen tile 606 (e.g., at the lower corners of the screen tile 606). In some embodiments, each of the screen tiles 606 in one or more rows of screen tiles 606 other than the uppermost and lowermost rows may be attached to a horizontal bar at the upper edge of the screen tile 606 (e.g., at the upper corners of the screen tile 606) and to a horizontal bar at the lower edge of the screen tile 606 (e.g., at the lower corners of the screen tile 606). In some embodiments, the screen tiles 606 may be attached to the mechanical structure such that there is no space between neighboring screen tiles 606. In some embodiments, because each screen tile 606 shares with its neighboring screen tiles 606 one or more attachment surfaces, the edges of neighboring screen tiles

606 may be perfectly aligned to each other in the direction orthogonal to the screen, so that the entire screen appears as a smooth surface with no sharp edges between tiles. In some embodiments, one or more cover layers (e.g., one or more thin cover layers) may be mounted over the array of screen tiles 606 of the display 116. In some embodiments, the screen tiles 606 may have no bezel, and the display and touch-sensitive surface of each screen tile 606 may cover the entire area of the screen tile 606. In some embodiments, the mechanical structure may prevent or reduce the occurrence of user-perceived discontinuities in the surface of the array of screen tiles 606 of the display 116.

Figure 6B:
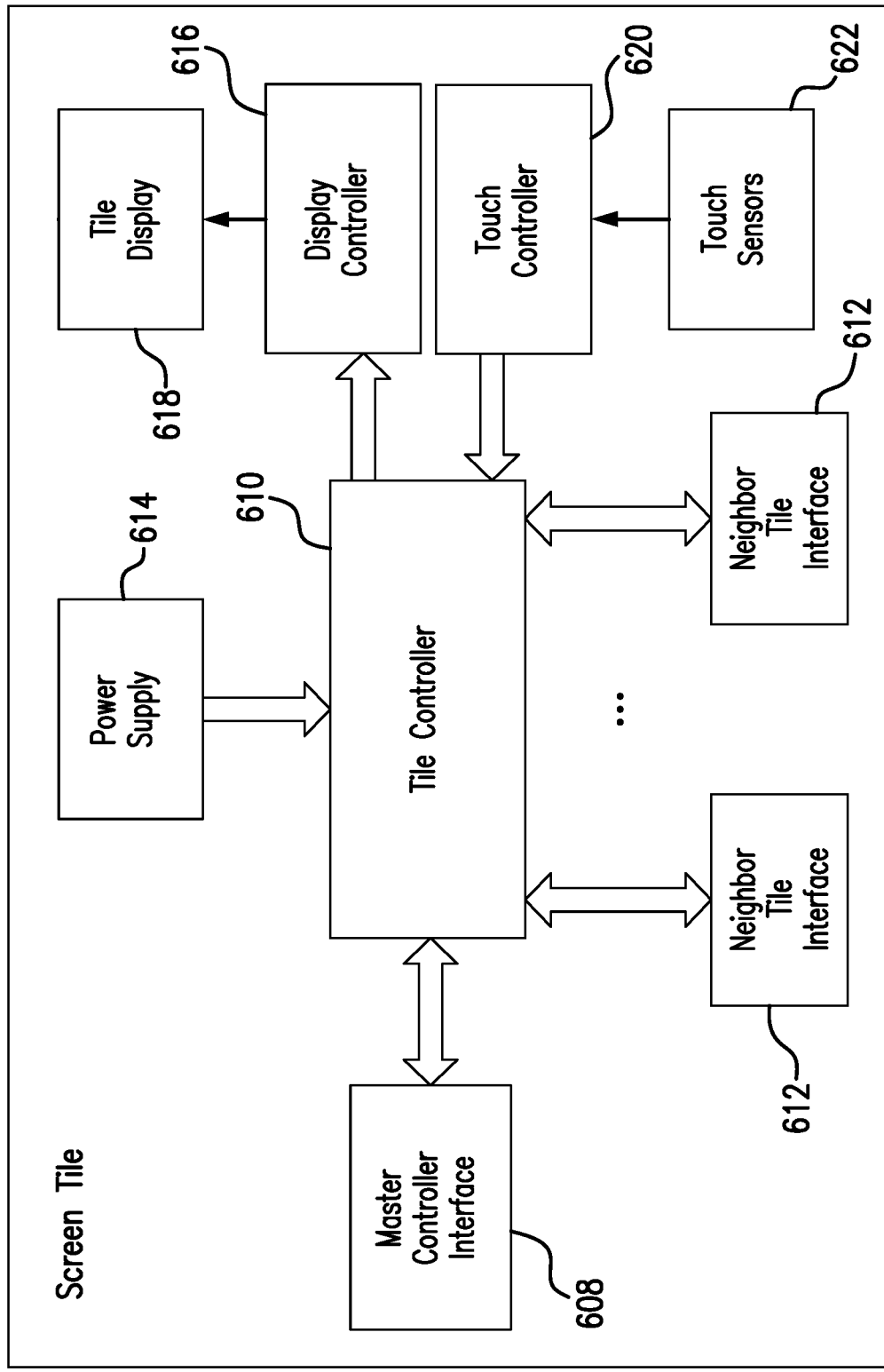
FIG. 6B is a block diagram of screen tile of a display device of a writing and/or drawing system embodying aspects of the present invention.

In some embodiments, the screen tiles 606 may be electronic displays with touch input technology. In some embodiments, as shown in FIG. 6B, a screen tile 606 may include a master controller interface 608, a tile controller 610, one or more neighbor tile interfaces 612, a power supply 614, a display controller 616, a tile display 618, a touch controller 620, and/or one or more touch sensors 622. In some embodiments, the tile controller 610 may send pixel data to the display controller 616, which may control the tile display 618 to display the pixel data. In some embodiments, the power supply 614 of a screen tile 606 may be a wired connection to the power supply 602 of the display device 106. In some embodiments, the tile controller 610 may process touch input events received from a touch controller 620, which receives the touch sensor data output from the one or more touch sensors 622. In some embodiments, the touch sensor data output from the one or more touch sensors 622 may indicate whether a tip of a stylus pen (e.g., a tip 212 of a pen 102A) is at the surface of the tile display 618. In some embodiments, the master controller interface 608 may connect the tile controller 610 with the one or more computers 114 of the display device 106. In some embodiments, the master controller interface 608 may be used to transfer screen contents and metadata between the one or more computers 114 and the tile controller 610.

In some embodiments, the one or more neighbor tile interfaces 612 may be bi-directional communication interfaces that connect directly the tile controller 610 with the tile controller 610 of each of the neighboring screen tiles 606. In some embodiments, the screen tile 606 may include a separate neighbor tile interface 612 for each of the neighboring screen tiles 606. In some embodiments, a screen tile 606 may have a number of neighbor tile interfaces 612 that depends on the number of neighboring screen tiles 606 the screen tile 606 will have. In some embodiments, the number of neighboring screen tiles 606 that a screen tile 606 will have may depend on the position of the screen tile 606 in the array of screen tiles 606 in the display 116. In some embodiments, the screen tiles 606 at the four corners of the array of screen tiles 606 may have three neighboring screen tiles 606 each and, thus, may each have three neighbor tile interfaces 612. In some embodiments, the screen tiles 606 in the uppermost and lowermost rows and in the leftmost and rightmost columns of the array of screen tiles 606 (other than the four screen tiles 606 at the corners) may have five neighboring screen tiles 606 each and, thus, may each have five neighbor tile interfaces 612. In some embodiments, the remaining screen tiles 606 (e.g., the screen tiles 606 that are in none of the uppermost and lowermost rows and the leftmost and rightmost columns of the array of screen tiles 606) may have eight neighboring screen tiles 606 each and, thus, may each have eight neighbor tile interfaces 612. In some alternative embodiments, each of the screen tiles 606 may include eight neighbor tile interfaces 612 (even though they may not all be connected to neighboring screen tiles 606) so that the screen tiles 606 may be used interchangeably in any position of the array of screen tiles 606.

In some embodiments, the tile controller 610 may handle touch input from the user (e.g., received via the one or more touch sensors 622 and the touch controller 620) and update the screen contents (e.g., via the display controller 616 and the tile display 618) according to instructions received from the one or more computers 114, which may act as a master controller. In some embodiments, depending on the current screen layout and the location of touch input events, the tile controller 610 may handle a touch input locally (e.g., without communicating the touch event to either of the one or more computers 114 and the neighboring screen tiles 606) or may communicate the touch event to the one or more computers 114 and/or the neighboring screen tiles 606. For example, in some embodiments, the tile controller 610 may handle a touch input locally when the user is drawing on the screen a line that is only within, and not near the boundary of, a single screen tile 606 (e.g., by using the display controller 616 to light pixels of the tile display 618 passed over by a tip of a stylus pen). In some embodiments, the tile controller 610 may communicate touch events to the one or more computers 114 and/or the neighboring screen tiles 606 when the touch events trigger an action that must be executed not just by the single screen tile 606 but also by other components (e.g., by one or more neighboring screen tiles 606 and/or by the one or more computers 114).

In some embodiments, the one or more computers 114 (e.g., firmware and/or an operating system running on one or more computers 114) may be aware of the relative positions of the screen tiles 606 and may implement bi-directional communication with each individual screen tile 606 (e.g., via the master controller interfaces 608 of the screen tiles 606). In some embodiments, the master controller interfaces 608 of the screen tiles 606 may be wired interfaces, and the one or more computers 114 may be connected via the wired interface to the tile controller 610 of each screen tile 606. In some embodiments, the one or more computers 114 may transfer screen contents from the remote system 108 to the screen tiles 606 (e.g., during an operation to open a saved board), and the one or more computers 114 may transfer screen contents from the screen tiles 606 to the remote system 108 (e.g., during a board save operation). In some embodiments, the one or more computers 114 may convey metadata to and receive metadata from tile controllers 610 of the screen tiles 606. For example, in some embodiments, the one or more computers 114 may convey instructions to the tile controllers 610 of the screen tiles 606 (e.g., on how to handle user touch input in each part of the display 116). For another example, in some embodiments, the tile controllers 610 of the screen tiles 606 may send specific touch input events to the one or more computers 114.

In some embodiments, two examples in which the one or more computers 114 of the display device 106 transfers screen contents between the one or more computers 114 and the tile controllers 610 of the screen tiles 606 are for the opening and saving of user files. In some embodiments, when a user opens a file stored in the user's online account on remote system 108 to display the file contents on the display device 106, the one or more computers 114 may retrieve the file from the remote system 108, partition the image to be displayed into tiles according to the geometry and arrangement of the screen tiles 606, and send to each tile controller 610 of the screen tiles 606 the relevant part of the image. In some embodiments, when a user saves the screen contents to a file in their online account on the remote system 108, each tile controller 610 of the screen tiles 606 sends to the one or more computers 114 the screen contents of each of the screen tiles 606, and the one or more computers 114 piece screen contents from each of the screen tiles 606 together, creates a file including the combined screen contents, and then sends the file to the remote system 108.

In some embodiments, the one or more computers 114 may transfer metadata from/to a tile controller 610, for example and without limitation, when the screen layout is initialized or modified and/or when user settings are changed. For example, in some embodiments, during screen initialization, the one or more computers 114 may instruct the tile controllers 610 of the screen tiles 606 in the uppermost row of the array of screen tiles 606 to display a toolbar at the top of the screen and use the remaining part of the tile surface as a drawing surface, and the one or more computers 114 may instruct the tile controllers 610 of all other screen tiles 606 to use their entire surface as a drawing surface. For another example, in some embodiments, when the user changes the settings associated to the currently used tool (e.g., when changing the line thickness of the pencil tool) or switches to a different tool (e.g., from pencil to eraser), the one or more computers 114 may send this information to each tile controller 610 of the screen tiles 606, so that the tile controllers 610 will react to user input according to the new settings. In some embodiments, the tile controller 610 of a screen tile 606 may transfer metadata to the one or more computers 114 when the user interacts with specific user interface elements on the screen tile 606 (e.g., when the user touches a button on the toolbar, the screen tile 606 where the button is displayed may send to the one or more computers 114 an event that signals the button press).

In some embodiments, the tile controller 610 of a screen tile 606 may use the one or more neighbor tile interfaces 612 of the screen tile 606 to send touch input events that are received by the local touch controller 620 (i.e., the touch controller 620 of the screen tile 606) but should also trigger a screen update in one or more neighboring tiles 606 to the one or more neighboring tiles 606 in which the screen update should be triggered. For example, in some embodiments, if the user is drawing on the display 116 a line near the border between two screen tiles 606, depending on the line thickness, some parts of the line may need to be displayed on a screen tile 606 different from the screen tile 606 that receives the touch input. In some embodiments, in this scenario, the screen tile 606 that receives the touch input may send the coordinates of the input events to the neighboring screen tile 606, and the neighboring screen tile 606 may update its screen contents with the relevant parts of the line being drawn. In some embodiments, all tile controllers 610 in the display 116 may be aware of the current settings such as line thickness and color, which may be communicated by the one or more computers 114 during initialization and every time a setting is modified.

In some embodiments, depending on the location of touch input relative to the borders between adjacent screen tiles 606, a given touch event may need to be handled by up to four screen tiles 606. In some embodiments, the tile controller 610 of the screen tile 606 that receives the event may determine which neighboring screen tiles 606 (if any) should be notified of the event, and the tile controller 610 may send the relevant touch event information to the relevant neighboring screen tiles 606.

5. Computer and/or Controller Architecture

Figure 7:
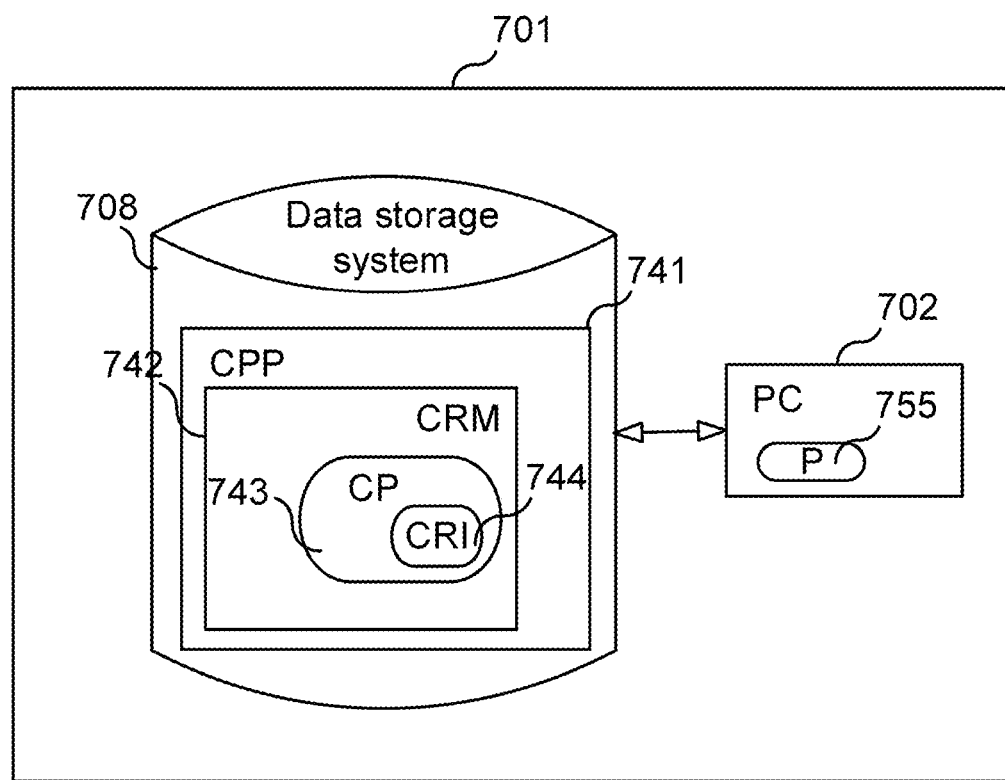
FIG. 7 is a block diagram of an apparatus of a writing and/or drawing system embodying aspects of the present invention.

FIG. 7 is a block diagram of an apparatus 701 for implementing the remote system 108, the setup computer 110, the one or more computers 114 of the display device 106, the controller 216 of a UC 102, and/or the controller 304 of a sensor 104, according to some embodiments. That is, the apparatus 701 can be adapted to perform the methods disclosed herein. As shown in FIG. 7, the apparatus 701 may include processing circuitry (PC) 702, which may include one or more processors (P) 755 (e.g., one or more general purpose microprocessors and/or one or more other processors, such as an application specific integrated circuit (ASIC), field-programmable gate arrays (FPGAs), and the like), which processors 755 may be co-located in a single housing or in a single data center or may be geographically distributed. In some embodiments, as shown in FIG. 7, the apparatus 701 may include one or more storage units (a.k.a., "data storage systems") 708 which may be co-located or geographically distributed and which may include one or more non-volatile storage devices and/or one or more volatile storage devices. In some embodiments where the PC 702 includes a programmable processor, the one or more storage units may include a computer program product (CPP) 741. In some embodiments, the CPP 741 may include a computer readable medium (CRM) 742 storing a computer program (CP) 743 comprising computer readable instructions (CRI) 744. In some embodiments, the CRM 742 may be a non-transitory computer readable medium, such as, magnetic media (e.g., a hard disk), optical media, memory devices (e.g., random access memory, flash memory), and the like. In some embodiments, the CRI 744 of the computer program 743 is adapted such that when executed by the PC 702, the CRI 741 may cause apparatus 701 to perform steps described herein (e.g., steps described herein with reference to the flow charts). In other embodiments, the apparatus 701 may be adapted to perform steps described herein without the need for code. That is, for example, the PC 702 may consist merely of one or more ASICs. Hence, the features of the embodiments described herein may be implemented in hardware and/or software.

6. Flowcharts

Figure 8:
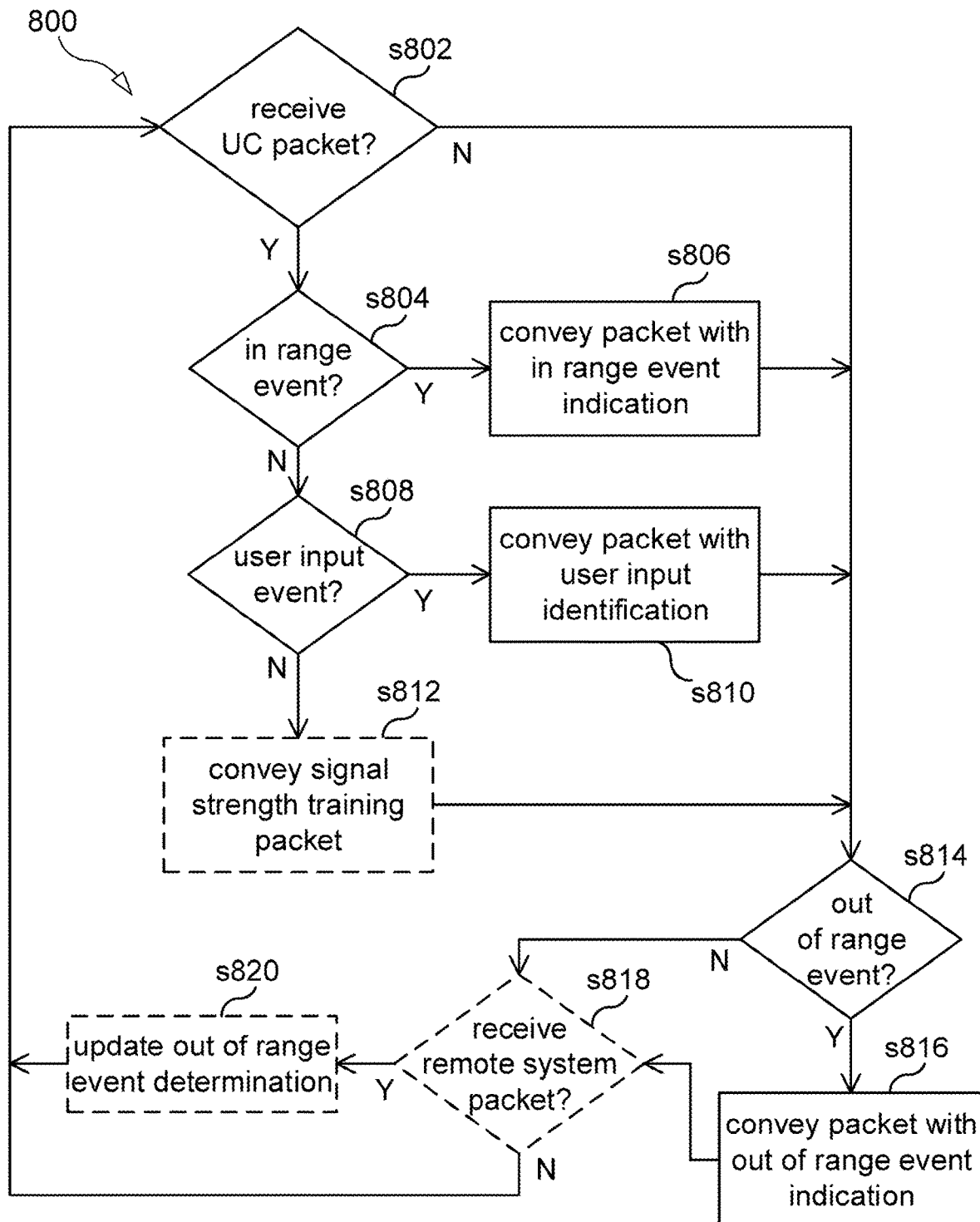
FIG. 8 is a flow chart illustrating a sensor process embodying aspects of the present invention.

FIG. 8 is a flow chart illustrating a process 800 according to some non-limiting embodiments of the invention. In some embodiments, the sensor 104 (e.g., the controller 304 of the sensor 104) may perform one or more steps of the process 800.

In some embodiments, as shown in FIG. 8, the process 800 may include a step 802 in which the sensor 104 determines whether a packet conveyed by a UC 102 was received by the sensor 104 (e.g., using the communication interface 308 of the sensor 104). In some embodiments, a packet conveyed by a UC 102 may include a UC identifier that identifies the UC 102 that conveyed the packet. In some embodiments, if the sensor 104 received a packet that was conveyed by a UC 102, the process 800 may proceed from the step 802 to a step 804. In some embodiments, if the sensor 104 did not receive a packet that was conveyed by a UC 102, the process 800 may proceed from the step 802 to a step 814.

In some embodiments, as shown in FIG. 8, the process 800 may include a step 804 in which the sensor 104 determines whether an in range event has occurred with respect to the UC 102 that conveyed the packet received by the sensor 104. In some embodiments, determining that the in range event has occurred with respect to the UC 102 that conveyed the packet received by the sensor 104 may include (i) determining that the UC identification that identifies the UC 102 is not in a list of UC identifications for current in range UCs and (ii) determining that an in range condition is met for the UC. In some embodiments, the sensor 104 may determine that the in range condition is met for the UC 102 if the sensor 104 receives one or more packets that include the UC identification that identifies the UC 102. In some alternative embodiments, the sensor 104 may determine that the in range condition is met for the UC 102 if the sensor 104 receives one or more packets that include the UC identification that identifies the UC 102 and have a signal strength that is above an in range signal strength threshold.

In some embodiments, if the sensor 104 determines that an in range event has occurred with respect to the UC 102 that conveyed the packet received by the sensor 104, the process 800 may proceed from the step 804 to a step 806. In some embodiments, if the sensor 104 does not determine that an in range event has occurred with respect to the UC 102 that conveyed the packet received by the sensor 104, the process 800 may proceed from the step 804 to a step 808.

In some embodiments, as shown in FIG. 8, the process 800 may include a step 806 in which the sensor 104 conveys a packet with an in-range event indication (e.g., using the communication interface 308 of the sensor 104). In some embodiments, the conveyed packet may include the UC identification that identifies the UC 102 that conveyed the packet received by the sensor 104, a sensor identification that identifies the sensor 104, and an indication that an in range event occurred. In some embodiments, the step 806 may include adding the UC identification that identifies the UC 102 for which the in range event occurred to the list of UC identifications for current in range UCs. In some embodiments, the process 800 may proceed from the step 806 to a step 814.

In some embodiments, as shown in FIG. 8, the process 800 may include a step 808 in which the sensor 104 determines whether a user input event has occurred with respect to the UC 102 that conveyed the packet received by the sensor 104. In some embodiments, the sensor 104 may determine that a user input event has occurred with respect to the UC 102 that conveyed the packet received by the sensor 104 if the packet includes a user input indication. In some embodiments, the user input indication may include an identification of a user input 208 of the UC 102 that conveyed the packet including the user input indication. In some embodiments, the user input indication may indicate that the user input 208 was activated.

In some embodiments, if the sensor 104 determines that a user input event has occurred with respect to the UC 102 that conveyed the packet received by the sensor 104, the process 800 may proceed from the step 808 to a step 810. In some embodiments, if the sensor 104 does not determine that a user input event has occurred with respect to the UC 102 that conveyed the packet received by the sensor 104, the process 800 may proceed from the step 808 to a step 814 (or to an optional step 812).

In some embodiments, as shown in FIG. 8, the process 800 may include a step 810 in which the sensor 104 conveys a packet with a user input event indication (e.g., using the communication interface 308 of the sensor 104). In some embodiments, the conveyed packet may include the UC identification that identifies the UC 102 that conveyed the packet and was included in the received packet, the sensor identification that identifies the sensor 104, and the user input indication received in the packet. In some embodiments, the process 800 may proceed from the step 810 to a step 814.

In some embodiments, as shown in FIG. 8, the process 800 may include an optional step 812 in which the sensor 104 conveys a signal strength training packet (e.g., using the communication interface 308 of the sensor 104). In some embodiments, the signal strength training packet may contain the sensor identification that identifies the sensor 104 and a signal strength value (e.g., an RSSI or RX value) of the packet conveyed by the UC 102 and received by the sensor 104. In some embodiments, the signal strength training packet may also contain the UC identifier that identifies the UC 102 that conveyed the packet and was received in the packet conveyed by the UC 102. In some embodiments, the process 800 may proceed from the step 812 to a step 814.

In some embodiments, as shown in FIG. 8, the process 800 may include a step 814 in which the sensor 104 determines whether an out of range event has occurred with respect to a UC 102. In some embodiments, the out of range event determination may be performed with respect to each UC 102 for which the sensor 104 (i) determined an in range event to have occurred and (ii) did not subsequently determine an out of range event to have occurred. In some embodiments, the out of range determination may be performed for each UC 102 having a UC identification in the list of UC identifications for current in range UCs.

In some embodiments, determining that an out of range event has occurred with respect to a UC 102 in step 814 may include determining that an out of range condition is met for the UC 102. In some embodiments, the sensor 104 may determine that the out of range condition is met for the UC 102 if the sensor 104 does not receive any packets that include the UC identification that identifies the UC 102 for a threshold amount of time, for each of N consecutive transmission periods, or for at least M of N consecutive transmission periods. In some alternative embodiments, the sensor 104 may determine that the out of range condition is met for the UC 102 if the sensor 104 does not receive any packets that include the UC identification that identifies the UC 102 and have a signal strength that is above an out of range signal strength threshold for a threshold amount of time, for each of N consecutive transmission periods, or for at least M of N consecutive transmission periods. In some embodiments, determining that the out of range event has occurred with respect to the UC 102 may further include determining that the UC identification for the UC 102 is in the list of UC identifications for current in range UCs.

In some embodiments, determining that the out of range event has occurred with respect to the UC 102 may further include reducing false out of range events. In some embodiments, determining that the out of range event has occurred with respect to the UC 102 may further include determining that a distribution of changes in signal strength of packets received from the UC 102 immediately prior to the UC 102 going out of range of the sensor 104 is within a threshold amount (e.g., 200%) of one standard deviation from a mean distribution of changes in signal strength of packets received by the sensor 104 from UCs 102 immediately preceding the UCs 102 going out of range of the sensor in true out of range events. In some embodiments, determining that the out of range event has occurred with respect to the UC 102 may further include, if a distribution of changes in signal strength of packets received from the UC 102 immediately prior to the UC 102 going out of range of the sensor is determined to be not within a threshold amount of one standard deviation from a mean distribution of changes in signal strength of packets received by the sensor 104 from UCs 102 immediately preceding the UCs 102 going out of range of the sensor in true out of range events, determining that the UC 102 does not reestablish communication with the sensor 104 within the predetermined amount of time.

In some embodiments, if the sensor 104 determines that an out of range event has occurred with respect to a UC 102, the process 800 may proceed from the step 814 to a step 816.

In some embodiments, if the sensor 104 does not determine that out of range event has occurred with respect to a UC 102, the process 800 may proceed from the step 814 back to the step 802 (or to an optional step 818).

In some embodiments, as shown in FIG. 8, the process 800 may include a step 816 in which the sensor 104 conveys a packet with an out of range event indication (e.g., using the communication interface 308 of the sensor 104). In some embodiments, the conveyed packet may include the UC identification that identifies the UC 102 for which the out of range event occurred, a sensor identification that identifies the sensor 104, and an indication that an out of range event occurred. In some embodiments, the step 816 may include removing the UC identification that identifies the UC 102 for which the out of range event occurred from the list of UC identifications for current in range UCs. In some embodiments, the process 800 may proceed from the step 816 back to the step 802 (or to an optional step 818).

In some alternative embodiments, instead of including the optional step 812 in which the sensor 104 conveys a signal strength training packet after a packet from a UC 102, the sensor 104 may wait until the sensor 104 determines in step 814 that an out of range event has occurred with respect to a UC 102 to conveys signal strength training information. That is, in some alternative embodiments, the step 816 may include conveying signal strength information to the remote system 108. In some embodiments, the signal strength information may include the sensor identification that identifies the sensor 104 and a signal strength values (e.g., an RSSI or RX value) of the packets conveyed by the UC 102 and received by the sensor 104 in a period of time, such as 1 second, before sensor 104 determined an out of range event to have occurred. In some embodiments, the signal strength information may be sent in the same packet that includes the indication that an out of range event occurred. In some alternative embodiments, the signal strength information may be sent in step 816 in one or more packets separate from the packet that includes the indication that an out of range event occurred.

In some embodiments, as shown in FIG. 8, the process 800 may include an optional step 818 in which the sensor 104 determines whether a packet conveyed by the remote system 108 was received by the sensor 104 (e.g., using the communication interface 308 of the sensor 104). In some embodiments, a packet conveyed by the remote system 108 may include information for reducing the occurrence of false out of range events. In some embodiments, the information for reducing the occurrence of false out of range events may include a standard deviation and a mean distribution of changes in signal strength of packets received by the sensor 104 from UCs 102 immediately preceding the UCs 102 going out of range of the sensor in true out of range events. In some embodiments, if the sensor 104 received a packet that was conveyed by the remote system 108, the process 800 may proceed from the step 818 to an optional step 820. In some embodiments, if the sensor 104 did not receive a packet that was conveyed by the remote system 108, the process 800 may proceed from the step 818 back to the step 802.

In some embodiments, as shown in FIG. 8, the process 800 may include an optional step 820 in which the sensor 104 updates the out of range event determination performed in step 814 based on the information for reducing the occurrence of false out of range events. In some embodiments, the process 800 may proceed from the step 820 back to the step 802.

In some embodiments, although FIG. 8 shows the steps of the process 800 in a particular order, the particular order is not required, and, in some alternative embodiments, one or more of the steps may be performed in a different order. For example, in some embodiments, the step 804 in which the sensor 104 determines whether an in range event has occurred with respect to the UC 102 that conveyed the packet received by the sensor 104 may be performed after the step 808 in which the sensor 104 determines whether a user input event has occurred with respect to the UC 102 that conveyed the packet received by the sensor 104. In addition, in some alternative embodiments, the process 800 may include fewer or more steps than those shown in FIG. 8.

Figure 9:
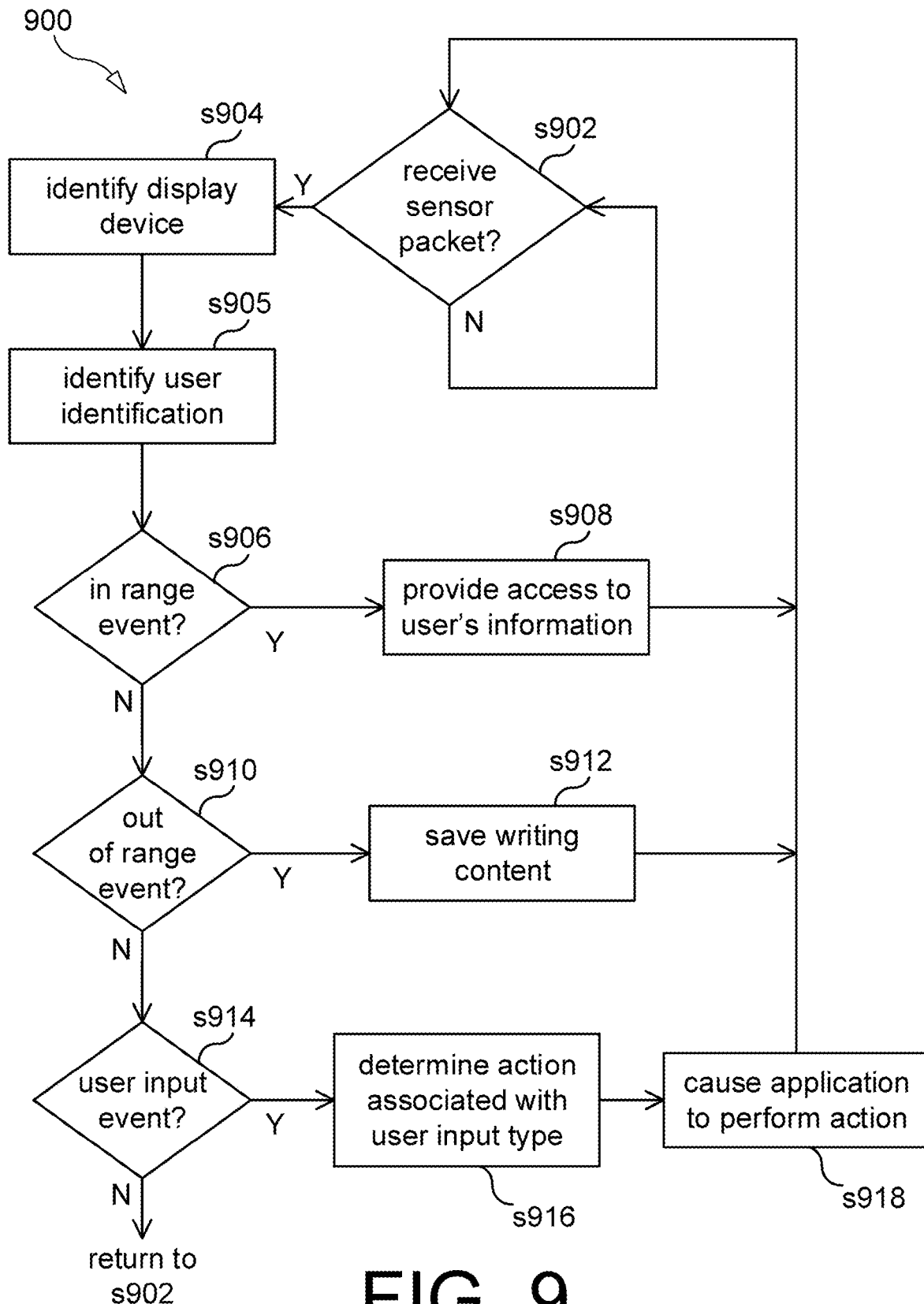
FIG. 9 is a flow chart illustrating a remote system process embodying aspects of the present invention.

FIG. 9 is a flow chart illustrating a process 900 according to some non-limiting embodiments of the invention. In some embodiments, the remote system 108 (e.g., a controller of the remote system 108) may be adapted to perform one or more steps of the process 900.

In some embodiments, as shown in FIG. 9, the process 900 may include a step 902 in which the remote system 108 determines whether a packet (e.g., a WebSocket packet) conveyed by a sensor 104 was received by the remote system 108. In some embodiments, a packet conveyed by a sensor 104 may include a sensor identification that identifies the sensor 104 that conveyed the packet, a UC identifier that identifies a UC 102 to which the packet pertains, and an event indication. In some embodiments, the remote system 108 may save the received packet (e.g., the web server 510 of the remote system 108 may save the incoming data on the dedicated server 506 that includes one or more in-memory data structures for real-time data transmission).

In some embodiments, as shown in FIG. 9, the process 900 may include a step 904 in which the remote system 108 identifies a display device 106. In some embodiments, the remote system 108 may identify a display device 106 using the received the sensor identification in the received packet. In some embodiments, the remote system 108 may identify the display device 106 to which the sensor 104 identified by the sensor identification is connected. In some embodiments, the remote system 108 may identify the display device 106 by identifying an application running on a computer 114 of the display device 106. In some embodiments, the application running on the computer 114 of the display device 106 may be the writing and/or drawing software running on the display device 106 (e.g., on the computer 114 of the display device 106). In some embodiments, the application may be a web application running in a web browser of the computer 114 of the display device 106 to which the sensor 104 identified by the sensor identification is connected. In some embodiments, the application (e.g., the writing and/or drawing software) may run on a user browser of the computer 114. In some embodiments, the application (e.g., the writing and/or drawing software) running on display device 106 may be continuously connected to the remote system 108 (e.g., the web server 510 on the remote system 108). In some embodiments, the application on the display device 106 may be connected to the remote system 108 using a WebSocket connection (e.g., a Websocket connection that is distinct from the WebSocket connection between the sensor 104 and the remote system 108). In some embodiments, the remote system 108 (e.g., the web server 510 of the remote system 108) may use the received sensor identification to identify an active writing and/or drawing software session on a user browser of a computer 114 of a display device 106 to which the sensor 104 is connected. In some embodiments, the remote system 108 may use the received sensor identification to identify an active writing and/or drawing software session by finding a browser cookie that contains the sensor identification.

In some embodiments, as shown in FIG. 9, the process 900 may include a step 905 in which the remote system 108 uses the UC identification to determine a user identification with which the UC identification is associated. In some embodiments, in step 905, the web server 510 of the remote system 108 may search the DMS 504 of the remote system 108 for the user identification associated with the UC identification received in the packet conveyed by the sensor 104.

In some embodiments, as shown in FIG. 9, the process 900 may include a step 906 in which the remote system 108 determines whether the received event indication is for an in range event. In some embodiments, if the remote system 108 determines that the event indication is for an in range event, the process 900 may proceed from the step 906 to a step 908. In some embodiments, in the step 908, the remote system 108 may provide the display device 106 (e.g., the application running on a computer 114 of the display device 106) with access to information in a user account associated with the user identification determined in step 905. In some embodiments, the information in the user account associated with the user identification determined in the step 905 may include one or more files including previous writing and/or drawing content. In some embodiments, in the step 908, the remote system 108 may cause the application (e.g., the writing and/or drawing software) running on the display device 106 to which the sensor 104 identified by the sensor identification is connected to display a welcome message including a username associated with the user identification determined in step 905. In some embodiments, the information in the user account associated with the determined user identification may include one or more settings for the application running on the computer 114 of the display device 106 to which the sensor 104 is connected, and, in the step 908, the remote system 108 may cause the application to apply the user settings.

In some embodiments, as shown in FIG. 9, the process 900 may include a step 910 in which the remote system 108 determines whether the received event indication is for an out of range event. In some embodiments, if the remote system 108 determines that the event indication is for an out of range event, the process 900 may proceed from the step 910 to a step 912. In some embodiments, in the step 912, the remote system 108 may cause the application (e.g., the writing and/or drawing software) running on the display device 106 to return current writing and/or drawing content. In some embodiments, the current writing and/or drawing content may be the content displayed by the display 116 of the display device 106. In some embodiments, the remote system 108 may receive the current writing and/or drawing content. In some embodiments, the remote system 108 may save the received current writing and/or drawing content in the user account associated with the user identification determined in step 905. In some embodiments, in the step 910, the remote system 108 may cause the application (e.g., the writing and/or drawing software) to erase the writing and/or drawing content displayed on the display 116 of the display device 106. In some embodiments, the remote system 108 may only erase the writing and/or drawing content if the UC 102 identified by the received UC identification is the only in range UC 102 (e.g., because no in range events occurred with respect to other UCs 102 that were not followed by out of range events with respect to those UCs 102). In some embodiments, in this case, the user associated with the received UC identification is the only in range user. In some embodiments, if the remote system 108 determines that another UC 102 is in range of the sensor 104, the remote system 108 may not cause the current writing and/or drawing content on the display 116 of the display device 106 to be erased. Instead, if the remote system 108 determines that another UC 102 is in range of the sensor 104, the remote system 108 may continue to display the current writing and/or drawing content to the remaining user(s). In some embodiments, in the step 910, the remote system 108 may cause the application (e.g., the writing and/or drawing software) to lock itself. In some embodiments, the remote system 108 may only lock the application if the UC 102 identified by the received UC identification is the only in range UC 102.

In some embodiments, as shown in FIG. 9, the process 900 may include a step 914 in which the remote system 108 determines whether the received event indication is for a user input event. In some embodiments, if the remote system 108 determines that the event indication is for a user input event, the process 900 may proceed from the step 914 to a step 916. In some embodiments, in the step 916, the remote system 108 may determine an action associated with the event indication. In some embodiments, an event indication that is for a user input event may include an identification of a user input 208 (e.g., button) of the UC 102 identified by the UC identification. In some embodiments, the action associated with the event indication may be determined based on the identification of the user input 208 of the UC 102 identified by the UC identification.

In some embodiments, as shown in FIG. 9, the process 900 may include a step 918 in which the remote system 108 causes the application (e.g., the writing and/or drawing software) to perform the determined action. In some embodiments, the determined action may, for example and without limitation, be one of toggle between pencil and eraser, undo last mark, copy board, and paste board.

In some embodiments, although FIG. 9 shows the steps of the process 900 in a particular order, the particular order is not required, and, in some alternative embodiments, one or more of the steps may be performed in a different order. For example, in some embodiments, the remote system 108 may identify the user identification in the step 905 before the remote system 108 identifies the display device 106 in the step 904. In addition, in some alternative embodiments, the process 900 may include fewer or more steps than those shown in FIG. 9.

Aspects of the present invention have been fully described above with reference to the drawing figures. Although the invention has been described based upon these preferred aspects, it would be apparent to those of skill in the art that certain modifications, variations, and alternative constructions could be made to the described aspects within the spirit and scope of the invention.

For example, in some alternative embodiments, the system 100 may additionally or alternatively include one or more UCs 102 that are dedicated to a display device 106, remain in the proximity of a sensor 104, and are in communication with the sensor 104 for the reporting user input events from the one or more dedicated UCs 102. For yet another example, a smartphone or tablet that includes a wireless communication interface may be used as a UC 102 (instead of a pen or pocket device) and communicate with the sensor 104 (e.g., using the smartphone's Bluetooth) to indicate that the smartphone or tablet is in range of the sensor 104 and/or to communicate one or more user input events to the sensor 104.

What is claimed is:

1. A sensor comprising:
   a communication interface; and
   a controller configured to:
   use the communication interface to receive a user controller (UC) identification conveyed by a UC, wherein the UC identification identifies the UC;
   determine whether an in range event has occurred with respect to the UC;
   if the in range event was determined to have occurred with respect to the UC, use the communication interface to convey the UC identification, a sensor identification, and an indication that an in range event occurred, wherein the sensor identification identifies the sensor;
   after determining that the in range event occurred with respect to the UC, determine whether an out of range event has occurred with respect to the UC, wherein determining that the out of range event has occurred with respect to the UC comprises determining that an out of range condition is met for the UC and removing the UC identification for the UC from a list of UC identifications for current in range UCs; and
   if the out of range event was determined to have occurred with respect to the UC, convey the UC identification, the sensor identification, and an indication that an out of range event occurred.

2. The sensor of claim 1, wherein the communication interface comprises a first wireless communication interface configured to communicate according to a first wireless communication protocol and a second wireless communication interface configured to communicate according to a second wireless communication protocol that is different than the first wireless communication protocol.

3. The sensor of claim 2, wherein the controller is configured to use the first wireless communication interface to receive the UC identification conveyed by the UC and to use the second wireless communication interface to convey the UC identification, the sensor identification, and the indication that the in range event occurred.

4. The sensor of claim 1, wherein determining that the in range event has occurred with respect to the UC comprises:
   determining that the UC identification that identifies the UC is not in the list of UC identifications for current in range UCs; and
   determining that an in range condition is met for the UC.

5. The sensor of claim 4, wherein the controller is configured to determine that the in range condition is met for the UC if the controller receives one or more packets that include the UC identification that identifies the UC.

6. The sensor of claim 4, wherein the controller is configured to determine that the in range condition is met for the UC if the controller receives one or more packets that include the UC identification that identifies the UC and have a signal strength that is above an in range signal strength threshold.

7. The sensor of claim 1, wherein the controller is further configured to:
   use the communication interface to receive a user input indication conveyed by the UC; and
   use the communication interface to convey the UC identification, the sensor identification, and the user input indication.

8. The sensor of claim 7, wherein the user input indication comprises an identification of a user input of the UC, and the user input indication indicates that the user input of the UC was activated.

9. The sensor of claim 7, wherein the user input indication comprises an identification of a button of the UC, and the user input indication indicates that the button of the UC was pressed.

10. The sensor of claim 7, wherein the controller uses the communication interface to convey the UC identification, the sensor identification, and the indication that the in range event occurred in a first packet and uses the communication interface to convey the UC identification, the sensor identification, and the user input indication in a second packet.

11. The sensor of claim 1, wherein the controller is configured to determine that the out of range condition is met for the UC if the controller does not receive any packets that include the UC identification that identifies the UC for a threshold amount of time, for each of N consecutive transmission periods, or for at least M of N consecutive transmission periods.

12. The sensor of claim 1, wherein the controller is configured to determine that the out of range condition is met for the UC if the controller does not receive any packets that include the UC identification that identifies the UC and have a signal strength that is above an out of range signal strength threshold for a threshold amount of time, for each of N consecutive transmission periods, or for at least M of N consecutive transmission periods.

13. The sensor of claim 1, wherein determining that the out of range event has occurred with respect to the UC further comprises reducing or preventing false out of range events.

14. The sensor of claim 1, wherein determining that the out of range event has occurred with respect to the UC further comprises determining that a distribution of changes in signal strength of packets received from the UC immediately prior to the UC going out of range of the sensor is within a threshold amount of one standard deviation from a mean distribution of changes in signal strength of packets received by the sensor from UCs immediately preceding the UCs going out of range of the sensor in true out of range events.

15. The sensor of claim 1, wherein determining that the out of range event has occurred with respect to the UC further comprises, if a distribution of changes in signal strength of packets received from the UC immediately prior to the UC going out of range of the sensor is determined to be not within a threshold amount of one standard deviation from a mean distribution of changes in signal strength of packets received by the sensor from UCs immediately preceding the UCs going out of range of the sensor in true out of range events, determining that the UC does not reestablish communication with the sensor within the predetermined amount of time.

16. The sensor of claim 1, wherein the controller uses the communication interface to convey the UC identification, the sensor identification, and the indication that the in range event occurred in a first packet and uses the communication interface to convey the UC identification, the sensor identification, and the indication that the out of range event occurred in a second packet.

17. A method comprising:
   receiving a user controller (UC) identification conveyed by a UC, wherein the UC identification identifies the UC;
   determining whether an in range event has occurred with respect to the UC;
   if the in range event was determined to have occurred with respect to the UC, conveying the UC identification, a sensor identification, and an indication that an in range event occurred, wherein the sensor identification identifies a sensor;

after determining that the in range event occurred with respect to the UC, determining whether an out of range event has occurred with respect to the UC, wherein determining that the out of range event occurred with respect to the UC comprises determining that an out of range condition is met for the UC and removing the UC identification for the UC from a list of UC identifications for current in range UCs; and if the out of range event was determined to have occurred with respect to the UC, conveying the UC identification, the sensor identification, and an indication that an out of range event occurred.

18. The method of claim 17, further comprising:

using a first wireless communication interface that communicates according to a first wireless communication protocol to receive the UC identification conveyed by the UC; and using a second wireless communication interface that communicates according to a second wireless communication protocol to convey the UC identification, the sensor identification, and the indication that the in range event occurred, wherein the second wireless communication protocol is different than the first wireless communication protocol.

19. The method of claim 17, wherein determining whether the in range event has occurred with respect to the UC comprises:

determining that the UC identification that identifies the UC is not in the list of UC identifications for current in range UCs; and determining that an in range condition is met for the UC.

20. The method of claim 19, wherein determining that the in range condition is met for the UC comprises determining that one or more packets that include the UC identification that identifies the UC were received.

21. The method of claim 19, wherein determining that the in range condition is met for the UC comprises determining that one or more packets that include the UC identification that identifies the UC and have a signal strength that is above an in range signal strength threshold were received.

22. The method of claim 17, further comprising:

receiving a user input indication conveyed by the UC; and conveying the UC identification, the sensor identification, and the user input indication.

23. The method of claim 22, wherein the user input indication comprises an identification of a user input of the UC, and the user input indication indicates that the user input of the UC was activated.

24. The method of claim 22, wherein the user input indication comprises an identification of a button of the UC, and the user input indication indicates that the button of the UC was pressed.

25. The method of claim 22, wherein the UC identification, the sensor identification, and the indication that the in range event occurred are conveyed in a first packet, and the UC identification, the sensor identification, and the user input indication are conveyed in a second packet.

26. The method of claim 17, wherein determining that the out of range condition is met for the UC comprises determining that no packets that include the UC identification that identifies the UC were received for a threshold amount of time, for each of N consecutive transmission periods, or for at least M of N consecutive transmission periods.

27. The method of claim 17, wherein determining that the out of range condition is met for the UC comprises determining that no packets that include the UC identification that identifies the UC and have a signal strength that is above an out of range signal strength threshold were received for a threshold amount of time, for each of N consecutive transmission periods, or for at least M of N consecutive transmission periods.

28. The method of claim 17, wherein determining that the out of range event has occurred with respect to the UC further comprises reducing or preventing false out of range events.

29. The method of claim 17, wherein determining that the out of range event has occurred with respect to the UC further comprises determining that a distribution of changes in signal strength of packets received from the UC immediately prior to the UC going out of range of the sensor is within a threshold amount of one standard deviation from a mean distribution of changes in signal strength of packets received by the sensor from UCs immediately preceding the UCs going out of range of the sensor in true out of range events.

30. The method of claim 17, wherein determining that the out of range event has occurred with respect to the UC further comprises, if a distribution of changes in signal strength of packets received from the UC immediately prior to the UC going out of range of the sensor is determined to be not within a threshold amount of one standard deviation from a mean distribution of changes in signal strength of packets received by the sensor from UCs immediately preceding the UCs going out of range of the sensor in true out of range events, determining that the UC does not reestablish communication with the sensor within the predetermined amount of time.

31. The method of claim 17, wherein the UC identification, the sensor identification, and the indication that the in range event occurred are conveyed in a first packet, and the UC identification, the sensor identification, and the indication that the out of range event occurred are conveyed in a second packet.

* * * * *